(12) United States Patent
Graziano et al.

(10) Patent No.: US 12,546,259 B2
(45) Date of Patent: Feb. 10, 2026

(54) SYSTEMS AND METHODS FOR INTEGRATING USE OF STARTER ON THE LOW PRESSURE SPOOL OF A TURBINE ENGINE

(71) Applicant: General Electric Company, Schenectady, NY (US)

(72) Inventors: Kevin Richard Graziano, Liberty Township, OH (US); Stefan Joseph Cafaro, Chapel Hill, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/600,209

(22) Filed: Mar. 8, 2024

(65) Prior Publication Data
US 2025/0283433 A1    Sep. 11, 2025

(51) Int. Cl.
*F02C 7/268* (2006.01)
(52) U.S. Cl.
CPC .......... *F02C 7/268* (2013.01); *F05D 2260/85* (2013.01); *F05D 2270/335* (2013.01)
(58) Field of Classification Search
CPC ............. F02C 7/26; F02C 7/268; F02C 7/275
See application file for complete search history.

(56) References Cited

U.S. PATENT DOCUMENTS

| 7,878,005 | B2 | 2/2011 | Bradbrook |
| 9,200,592 | B2 | 12/2015 | Berryann |
| 10,487,839 | B2 | 11/2019 | Kupiszewski |
| 10,598,047 | B2 | 3/2020 | Clauson |
| 11,230,941 | B2 | 1/2022 | Bradley |
| 11,230,942 | B2 | 1/2022 | Bradley |
| 11,384,655 | B2 | 7/2022 | Davies |
| 2013/0204506 | A1* | 8/2013 | Ertz ........................ F02N 11/04 290/34 |
| 2014/0102111 | A1* | 4/2014 | Allen ........................ F02C 9/00 60/773 |
| 2014/0306460 | A1 | 10/2014 | Donnelly |
| 2017/0190441 | A1* | 7/2017 | Mackin ................. B64D 41/00 |
| 2020/0173368 | A1* | 6/2020 | Husband .................. F02C 9/00 |
| 2020/0392903 | A1* | 12/2020 | Turner ...................... F02C 9/54 |

(Continued)

FOREIGN PATENT DOCUMENTS

| FR | 3127024 | 3/2023 |
| FR | 3127025 | 3/2023 |
| FR | 3127269 | 3/2023 |

(Continued)

*Primary Examiner* — Gerald L Sung
(74) *Attorney, Agent, or Firm* — Smith Gambrell & Russell LLP

(57) ABSTRACT

A propulsion system includes a gas turbine engine includes a low speed spool and a high speed spool. The low speed spool includes a low pressure (LP) compressor coupled to a LP turbine via a LP shaft. The high speed spool comprising includes a high pressure (HP) compressor coupled to a HP turbine via a HP shaft. A first starter motor coupled to the HP shaft and configured to provide motive power to spin the HP shaft to start the gas turbine engine. A second starter motor coupled to the LP shaft and configured to provide torque to the LP shaft. A controller configured to operate on the second starter motor to provide the torque to the LP shaft based on a base LP shaft torque schedule.

18 Claims, 13 Drawing Sheets

(56) References Cited

U.S. PATENT DOCUMENTS

2021/0115857 A1    4/2021  Collopy

FOREIGN PATENT DOCUMENTS

| | | |
|---|---|---|
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

\* cited by examiner

1204

| | |
|---|---|
| Base LP shaft torque schedule shown in FIG. 3 | Base LP shaft torque schedule shown in FIG. 7A |
| Base LP shaft torque schedule shown in FIG. 4 | Base LP shaft torque schedule shown in FIG. 7B |
| Base LP shaft torque schedule shown in FIG. 5A | Base LP shaft torque schedule shown in FIG. 8A |
| Base LP shaft torque schedule shown in FIG. 5B | Base LP shaft torque schedule shown in FIG. 8B |
| Base LP shaft torque schedule shown in FIG. 6A | Base LP shaft torque schedule shown in FIG. 9B |
| Base LP shaft torque schedule shown in FIG. 6B | Base LP shaft torque schedule shown in FIG. 10B |
| | Base LP shaft torque schedule shown in FIG. 11 |

FIG. 13

SYSTEMS AND METHODS FOR INTEGRATING USE OF STARTER ON THE LOW PRESSURE SPOOL OF A TURBINE ENGINE

FIELD OF THE DISCLOSURE

The present subject matter relates generally to turbine engines, and specifically to starter use on the low pressure spool of turbine engines.

BACKGROUND

Gas turbine systems can include one or more engines for propulsions. Each engine can include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. Generally, a starter coupled to a high pressure shaft of an engine is used to initiate a start-up operation of an aircraft.

BRIEF DESCRIPTION OF THE DRAWINGS

A full and enabling description of the present disclosure, including the best mode thereof, directed to one of ordinary skill in the art, is set forth in the specification, which makes reference to the appended figures, in which:

FIG. 13 is a diagram depicting exemplary base LP shaft torque schedules according to some embodiments.

DETAILED DESCRIPTION

Figure 1:
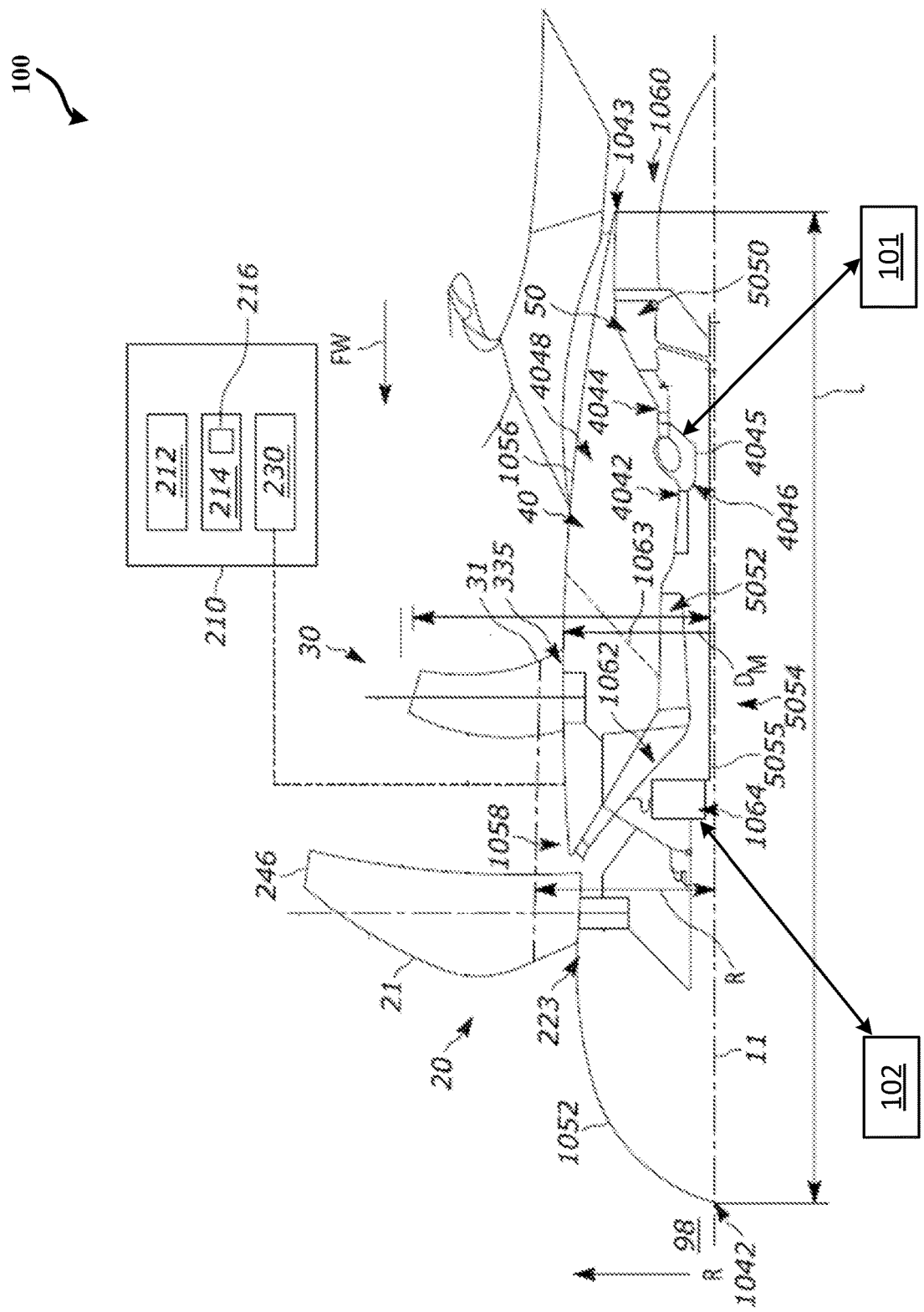
FIG. 1 is a cross-sectional side view of an embodiment of a propulsion system according to some embodiments.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In some aspects, systems and methods described herein are configured to increase air flow and/or pressure at a compressor inlet, which is favorable for compressor operability. In some embodiments, improvement in the compressor operability improves starting operability of an aircraft. In some aspects, the improved starting operability can result in reduction and/or elimination of other sub-systems that could be needed for starting (e.g., bleeds). In some embodiments, improvement in the compressor operability improves start times of the aircraft. In some aspects, the improved start times of the aircraft can result in improvements of ground operations for airliners.

In some embodiments, a propulsion system includes a gas turbine engine including a low speed spool and a high speed spool. The low speed spool may include a low pressure (LP) compressor coupled to a LP turbine via a LP shaft. The high speed spool may include a high pressure (HP) compressor coupled to a HP turbine via a HP shaft. In some embodiments, a first starter motor is coupled to the HP shaft and may provide motive power to spin the HP shaft to start the gas turbine engine. In some embodiments, a second starter motor is coupled to the LP shaft and may provide torque to the LP shaft. In some embodiments, the propulsion system includes a controller. In some aspects, the controller operates on the second starter motor to provide the torque to the LP shaft based on a base LP shaft torque schedule.

In some embodiments, a method includes operating a propulsion system of an aircraft to start a gas turbine engine. In some aspects, the gas turbine engine includes a low speed spool and a high speed spool. The low speed spool may include a low pressure (LP) compressor coupled to a LP turbine via a LP shaft. The high speed spool may include a high pressure (HP) compressor coupled to a HP turbine via a HP shaft. In some embodiments, a first starter motor is coupled to the HP shaft and a second starter motor is coupled to the LP shaft. In some embodiments, the method includes operating, by a controller of the propulsion system, the second starter motor to provide torque to the LP shaft based on a base LP shaft torque schedule.

In some embodiments, a non-transitory, machine-accessible storage medium having computer instructions and where the computer instructions, when executed by a controller, cause the controller to operate a propulsion system of an aircraft to start a gas turbine engine. The gas turbine engine includes a low speed spool and a high speed spool. The low speed spool may include a low pressure (LP) compressor coupled to a low pressure turbine via a low pressure shaft. The high speed spool includes a high pressure (HP) compressor coupled to a HP turbine via a HP shaft, and wherein a first starter motor is coupled to the HP shaft and a second starter motor is coupled to the LP shaft. In some embodiments, the non-transitory, machine-accessible storage medium having the computer instructions and where the computer instructions, when executed by a controller, cause the controller to operate the second starter motor to provide torque to the LP shaft based on a base LP shaft torque schedule.

Referring now to the drawings, wherein identical numerals indicate the same elements throughout the figures, certain embodiments will be described. Referring to FIG. 1, in general, embodiments of an engine 100 variously depicted and described herein include a computing system 210 configured to include one or more controllers, and/or configured to execute steps of a method or other operations provided herein. For instance, FIG. 1 illustrates one embodiment of suitable components that can be included within the computing system 210. As shown in FIG. 1, the computing system 210 can include a controller 212 (which may include one or more processors) and associated memory 214 configured to perform a variety of computer-implemented functions (e.g., performing the methods, steps, calculations and the like disclosed herein).

As shown, the computing system 210 can include control logic 216 stored in memory 214. The control logic 216 may include instructions that, when executed by one or more controllers 212, cause the one or more controllers 212 to perform operations, such as the method or operations described herein. Additionally, as shown in FIG. 1, the computing system 210 can also include a communications interface module 230. In several embodiments, the communications interface module 230 can include associated electronic circuitry that is used to send and receive data. As such, the communications interface module 230 of the computing system 210 can be used to send and/or receive data to/from the engine 100 and any other suitable components of the engine 100, including any number of motors, actuators, fuel lines, linkages, vane or blade pitch change mechanisms, sensors, or other actuatable structures, such as one or more of such components as depicted and described herein.

It should be appreciated that the communications interface module 230 can be any combination of suitable wired and/or wireless communications interfaces and, thus, can be communicatively coupled to one or more components of the engine 10 via a wired and/or wireless connection. As such, the computing system 210 may obtain, determine, store, generate, transmit, or operate any one or more steps of the operations such as described herein with regard to the engine 100 or an apparatus (e.g., aircraft or other vehicle) to which the engine 100 is attached. In some embodiments, the computing system 210 may include a Full Authority Digital Engine Control (FADEC) system. In some embodiments, a controller 212 includes an electronic engine controller of a FADEC system.

Additionally, it should be appreciated that although FIG. 1 depicts a single unducted rotor engine, the descriptions, functions, and/or methods described herein are generally applicable to gas turbine engines. For example, gas turbine engines may include jet turbine engines, turboprop engines, turbofan engines, turboshaft engines, or any other suitable engine, including piston or reciprocating engines.

Further, some embodiments of gas turbine engines described hereinbelow may include one or more electric machines. An electric machine may generally include a stator and a rotor, the rotor rotatable relative to the stator. Additionally, the electric machine may be configured to convert mechanical power to electrical power, or electrical power to mechanical power. For example, the electric machine may be configured as an asynchronous or induction electric machine operable to generate or utilize alternating current (AC) electric power. Alternatively, the electric machine may be configured as a synchronous electric machine operable to generate or utilize AC electric power or direct current (DC) electric power. In such a manner, it will be appreciated that the stator, the rotor, or both may generally include one or more of a plurality of coils or winding arranged in any suitable number of phases, one or more permanent magnets, one or more electromagnets, etc.

FIG. 1 shows an elevational cross-sectional view of an exemplary embodiment of a single unducted rotor engine 100. As is seen from FIG. 1, the engine 100 takes the form of an open rotor propulsion system and has a rotor assembly 20 which includes an array of airfoil blades 21 around a longitudinal axis 11 of engine 100. Blades 21 are arranged in typically equally spaced relation around the longitudinal axis 11, and each blade 21 has a root 223 and a tip 246 and a span defined therebetween.

Additionally, the engine 100 includes a gas turbine engine having a core (or high pressure system) 40 and a low pressure system 50. The core engine 40 generally includes a high pressure compressor 4042, a high pressure turbine 4044, and a high pressure shaft 4045 extending therebetween and connecting the high pressure compressor 4042 and high pressure turbine 4044. The high pressure compressor 4042, the high pressure turbine 4044, and the high pressure shaft 4045 may collectively define and be referred to as a high pressure spool/high speed spool 4046 of the engine. Further, a combustion section 4048 is located between the high pressure compressor 4042 and high pressure turbine 4044. The combustion section 4048 may include one or more configurations for receiving a mixture of fuel and air and providing a flow of combustion gasses through the high pressure turbine for driving the high pressure spool 4046.

In some embodiments, a first starter motor 101 is coupled to the HP shaft 4045 to provide motive power to spin the HP shaft 4045 to start the gas turbine engine. In some embodiments, the first starter motor 101 may include an electric starter (e.g., electric machine), a hydraulic starter, a pneumatic starter, and/or a fuel/air turbine starter (Auxiliary Power Unit, APU), to name a few. In some embodiments, the first starter motor 101 may be coupled to the HP shaft 4045 via a gearbox (not shown).

The low pressure system 50 similarly includes a low pressure turbine 5050, a low pressure compressor 5052, and a low pressure shaft 5055 extending between and connecting the low pressure compressor 5052 and low pressure turbine 5050. The low pressure compressor 5052, the low pressure turbine 5050, and the low pressure shaft 5055 may collectively define and be referred to as a low pressure spool/low speed spool 5054 of the engine 100.

In various embodiments, the core engine 40 may include a third-stream flowpath 1063, such as to bypass flow from a core flowpath downstream of one or more compressors. The third-stream flowpath 1063 may generally define a concentric or non-concentric flowpath relative to the flowpath 1062 downstream of one or more compressors or fan stages. The third-stream flowpath 1063 is configured to selectively remove a portion of flow from the core flowpath 1062, such as via one or more variable guide vanes, nozzles, or other actuatable flow control structures. The third-stream flowpath 1063 may bypass the combustion section 4048. In certain embodiments, the third-stream flowpath 1063 furthermore bypasses all or part of the flowpath at the turbine section.

It should be appreciated that the terms "low" and "high," or their respective comparative degrees (e.g., -er, where applicable), when used with compressor, turbine, shaft, or spool components, each refer to relative pressure and/or speeds within an engine unless otherwise specified. For example, a "low turbine" or "low pressure turbine" or "low speed turbine" defines a component configured to operate at a rotational speed, such as a maximum allowable rotational speed producing corresponding air pressure, lower than a "high turbine" or "high pressure turbine" or "high speed turbine" at the engine. Alternatively, unless otherwise specified, the aforementioned terms may be understood in their superlative degree. For example, a "low turbine" or "low pressure turbine" or "low speed turbine" may refer to the lowest maximum rotational speed turbine producing corresponding air pressure within a turbine section. A "low compressor" or "low pressure compressor" or "low speed compressor" may refer to the lowest maximum rotational speed compressor producing corresponding air pressure within a compressor section. A "high turbine" or "high pressure turbine" or "high speed turbine" may refer to the highest maximum rotational speed turbine producing corresponding air pressure within the turbine section. A "high compressor" or "high pressure compressor" or "high speed compressor" may refer to the highest maximum rotational speed compressor producing corresponding air pressure within the compressor section. Similarly, the low speed spool or the low pressure spool refers to a lower maximum rotational speed or air pressure than the high speed spool or the high pressure spool. It should further be appreciated that the terms "low" or "high" in such aforementioned regards may additionally, or alternatively, be understood as relative to minimum allowable speeds or air pressure, or minimum or maximum allowable speeds or air pressure relative to normal, desired, steady state, etc. operation of the engine.

Although the engine 100 is depicted with the low pressure compressor 5052 positioned forward (i.e., proximate to a forward end 98) of the high pressure compressor 4042, in certain embodiments the compressors 4042, 5052 may be in interdigitated arrangement, i.e., rotary airfoils of the low pressure compressor 5052 are in alternating arrangement along the gas flowpath with rotary airfoils of the high pressure compressor 4042. Additionally, or alternatively, although the engine 100 is depicted with the high pressure turbine 4044 positioned forward of the low pressure turbine 5050, in certain embodiments the turbines 4044, 5050 may be in interdigitated arrangement.

In FIG. 1, the core engine 40 is generally encased in a cowl 1056 defining a maximum diameter DM. The vane assembly 30 is extended from the cowl 1056 and positioned aft of the rotor assembly 20. In various embodiments, the maximum diameter is defined as a flowpath surface facing outward along the radial direction R in fluid communication with the flow of fluid egressed from the rotor assembly 20. In certain embodiments, the maximum diameter of the cowl 1056 corresponds substantially to a location or positioning of a root 335 of a vane 31 of the vane assembly 30 extended from the cowl 1056. The rotor assembly 20 further includes a hub 1052 extended forward of the plurality of blades 21. In certain embodiments, the engine 100 defines a length L from a forward end 1042 of the hub 1052 to an aft end 1043 of the cowl 1056.

Moreover, it will be appreciated that the engine 100 further includes a cowl 1056 surrounding the turbomachinery and defining at least in part an inlet 1058, an exhaust 1060, and the turbomachinery flowpath 1062 extending between the inlet 1058 and the exhaust 1060. The inlet 1058 is for the embodiment shown an annular or axisymmetric 360 degree inlet 1058 located between the rotor assembly 20 and the vane assembly 30, and provides a path for incoming atmospheric air to enter the turbomachinery flowpath 1062 (and compressors, combustion section, and turbines) radially inwardly of the vane assembly 30. Such a location may be advantageous for a variety of reasons, including management of icing performance as well as protecting the inlet 1058 from various objects and materials as may be encountered in operation.

As is depicted, the rotor assembly 20 is driven by the turbomachinery, and more specifically, is driven by the low pressure spool 5054. More specifically, still, engine 100 in the embodiment shown in FIG. 1 includes a power gearbox 1064, and the rotor assembly 20 is driven by the low pressure spool 5054 of the turbomachinery across the power gearbox 1064. In such a manner, the rotating blades 21 of the rotor assembly 20 may rotate around the axis 11 and generate thrust to propel the engine 100, and hence an aircraft to which it is associated, in a forward direction FW.

The power gearbox 1064 may include a gearset for decreasing a rotational speed of the low pressure spool 5054 relative to the low pressure turbine 5050, such that the rotor assembly 20 may rotate at a slower rotational speed than the low pressure spool 5054. In certain embodiments, the power gearbox 1064 includes a gear ratio of at least 4:1. Although in various embodiments the 4:1 gear ratio may generally provide for the low pressure turbine 5050 to rotate at approximately four times the rotational speed of the rotor assembly 20, it should be appreciated that other structures provided herein, such as the blade pitch change mechanism and/or an electric machine, may allow the unducted rotor assembly 20 to operate substantially de-coupled from the low pressure turbine 5050 rotational speed. Moreover, when using an interdigitated counter-rotating or vaneless turbine the gear ratio may be reduced without an appreciable loss in output power from the rotor assembly 20.

In some embodiments, a second starter motor 102 is coupled to the LP shaft 5055 to provide torque to the LP shaft 5055. In such embodiments, the power gearbox 1064 may be coupled to the second starter motor 102 and include a gearset to initiate and/or increase rotation of the LP shaft 5055. In some embodiments, the second starter motor 102 may include an electric starter (e.g., an electric machine), a hydraulic starter, a pneumatic starter, and/or a fuel/air turbine starter (Auxiliary Power Unit, APU), to name a few. In some embodiments, the two starter motors 101, 102 may correspond to a single starter motor configured to separately provide torque to either the LP shaft 5055 or the HP shaft 4045, or both.

During operation, the computing system 210 and/or the controller 212 associated with the engine can monitor the operating and environmental conditions of the engine and/or the aircraft to which the engine is mounted based on received data (e.g., engine sensor data, aircraft data, environmental data, etc.). In some embodiments, the computing system 210 and/or the controller 212 can determine whether one or more target values, thresholds, or parameters (e.g., a target speed, a target power, and/or a target set point, to name a few) are met (matches or equal to) and/or exceeded (greater than) based on the received data. It is understood that descriptions and/or functions associated with, and/or methods executed by the controller 212 as described herein are attributable to the computing system 210.

Figure 2:
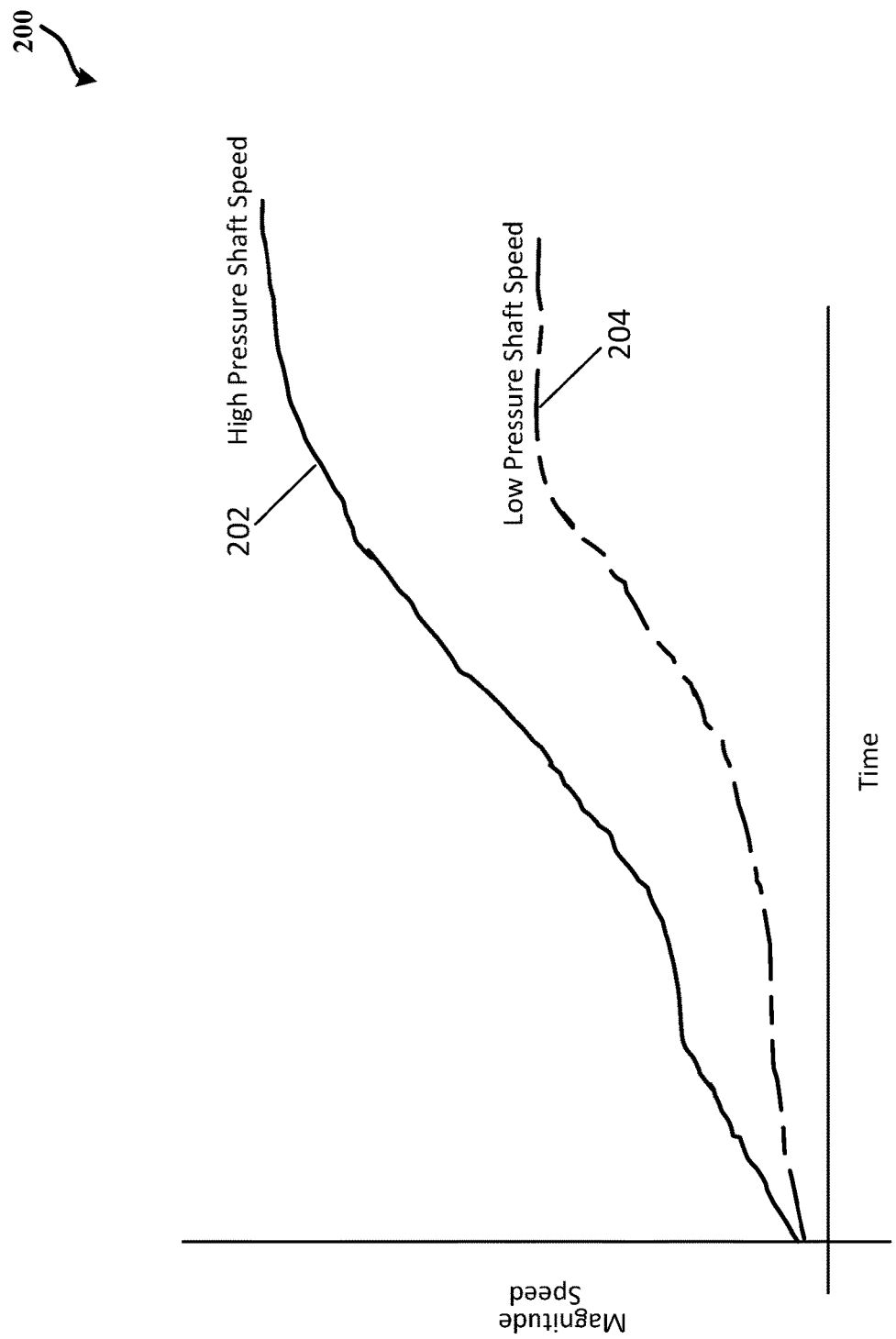
FIG. 2 is a diagram of an exemplary low pressure (LP) shaft speed relative to a high pressure (HP) shaft speed when a controller does not operate on a second starter motor to provide torque to the LP shaft according to some embodiments.

FIG. 2 is a diagram 200 of the speed 204 of the LP shaft 5055 relative to speed 202 of the HP shaft 4045 when the controller 212 does not operate on the second starter motor 102 to provide torque to the LP shaft 5055 according to some embodiments. As shown in FIG. 2 in the intersection of the axes, when no torque is provided to the LP shaft 5055, the LP shaft 5055 rotates and/or accelerates only based on the aerodynamic cycle driven by the rotation and/or acceleration of the HP shaft 4045. In such embodiments, the low pressure system 50 is "along for the ride" with the high pressure system (the core 40).

Figure 3:
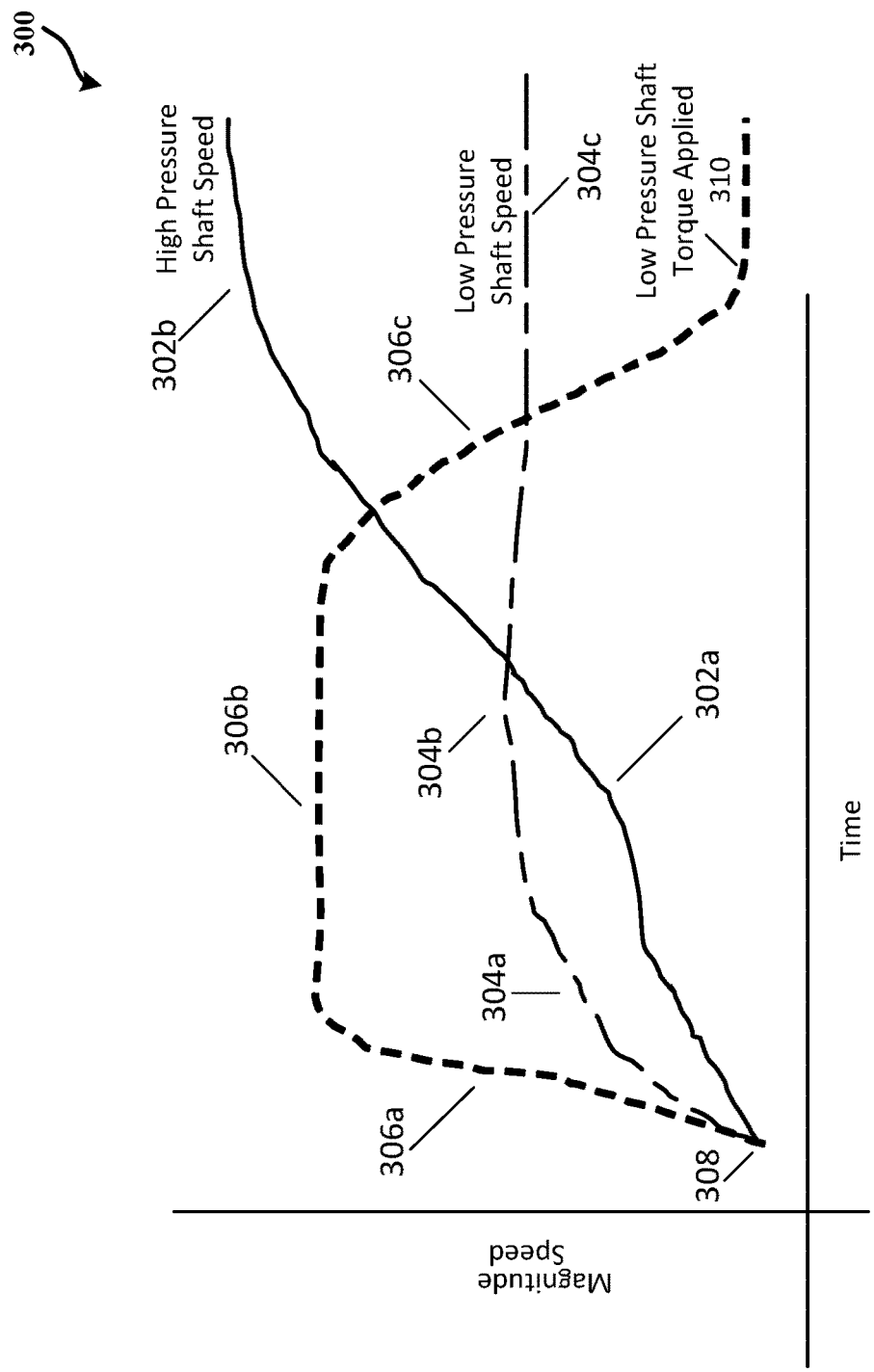
FIG. 3 is diagram illustrating the exemplary speed of the LP shaft relative to speed of the HP shaft when a controller operates on a second starter motor to provide torque to the LP shaft according to some embodiments.

FIG. 3 is a diagram 300 illustrating the exemplary speed of the LP shaft 5055 relative to speed of the HP shaft 4045 when the controller 212 operates on the second starter motor 102 to provide torque to the LP shaft 5055 based on a base LP shaft torque schedule 310 according to some embodiments. In FIG. 3, at 308, the controller 212 causes both the first starter motor 101 to provide motive power to spin the HP shaft 4045 to start the engine 100 and the second starter motor 102 to provide torque to the LP shaft 5055. In response, at 306a, the torque provided to the LP shaft 5055 is increasing causing the rotational speed of the LP shaft 5055 to also start increasing at 304a. The rotational speed of the HP shaft 4045 is also increasing in response to the operation of the controller 212 of the first starter motor 101. At 306b, the controller 212 causes the second starter motor 102 to provide a constant torque and/or maintain the current applied torque to the LP shaft 5055. At 304b, the combination of the aerodynamic coupling of the air pressure caused by the rotational speed of the HP shaft 4045 with the torque applied to the LP shaft 5055 by the second starter motor 102 causes the speed of the LP shaft 5055 to reach a constant speed. At 306c, the second starter motor 102 starts decreasing and eventually ceasing the torque applied to the LP shaft 5055. At 304c, the idle speed of the LP shaft 5055 has been reached. In some embodiments, the idle speed of the LP shaft 5055 is less than or equal to the constant speed of the LP shaft 5055 at 304b. In some embodiments, at 302a before the idle speed of the HP shaft 4045 is reached at 302b, the second starter motor 102 has started decreasing the torque applied to the LP shaft 5055. For example, before the ground idle speed of the HP shaft 4045 is reached, the second starter motor 102 may start to decrease the torque applied to the LP shaft 5055.

In some embodiments, although the start time (that is, the time the idle speed of the HP shaft 4045 is reached) of the engine in FIG. 2 is the same as the start time of the engine in FIG. 3, there is more operability margin with the engine in FIG. 3 as a result of the torque being provided to the LP shaft 5055 during the engine start up. One of the resulting benefits is that there is a reduction (less airflow required) and/or elimination of other sub-systems that may be needed for starting the engine (e.g., less bleed requirements to start the engine). Another benefit is that it covers more variation effects. For example, for a free spinning LP shaft 5055 (that is, the rotation of the LP shaft 5055 is due to the aerodynamic coupling with the HP shaft 4045), there may have several effects that could impact aircraft and/or engine start time including oil temperature, viscous drag terms, outside ambient conditions, and/or engine deterioration (turbine, fan, etc.). In some embodiments, providing direct speed control to the LP shaft 5055 using electric power, for example, normalizes all of these effects by maintaining a fixed speed profile.

In some embodiments, there may be engine to engine variation in hardware, such as tolerance stacks of all the hardware components combined with the tolerance stacks of all the electrical components. For example, while a 'nominal' engine may have no issue, a 'min' engine (where all the hardware stacks are at max worse case limits) may not. In such example, a bleed system may be added, such that the bleed system can be covered by an existing motor generator sub-system on the LP system 50.

One of the benefits of providing torque to the LP shaft 5055 based on one or more base LP shaft torque schedules described herein during start-up (e.g., on-ground and/or in-flight, to name a few) of an engine is allowing the first starter motor 101 to be sized smaller relative to the standard or average size of an engine not implementing or using the LP shaft torque schedules described herein; which saves weight (e.g., engine weight, gearbox weight, to name a few) and/or reduces the envelope that lead to at least reductions in specific fuel consumption (SFC) and/or easier under cowl integration, to name a few.

Moreover, a HP starter motor 101 that is sized smaller is advantageous. For example, the packaging of under cowl components, and/or the reduction in Gear Box (GB) size may result in overall reduction of engine weight, which improves Specific fuel Consumption (SFC) of the engine 100.

Figure 4:
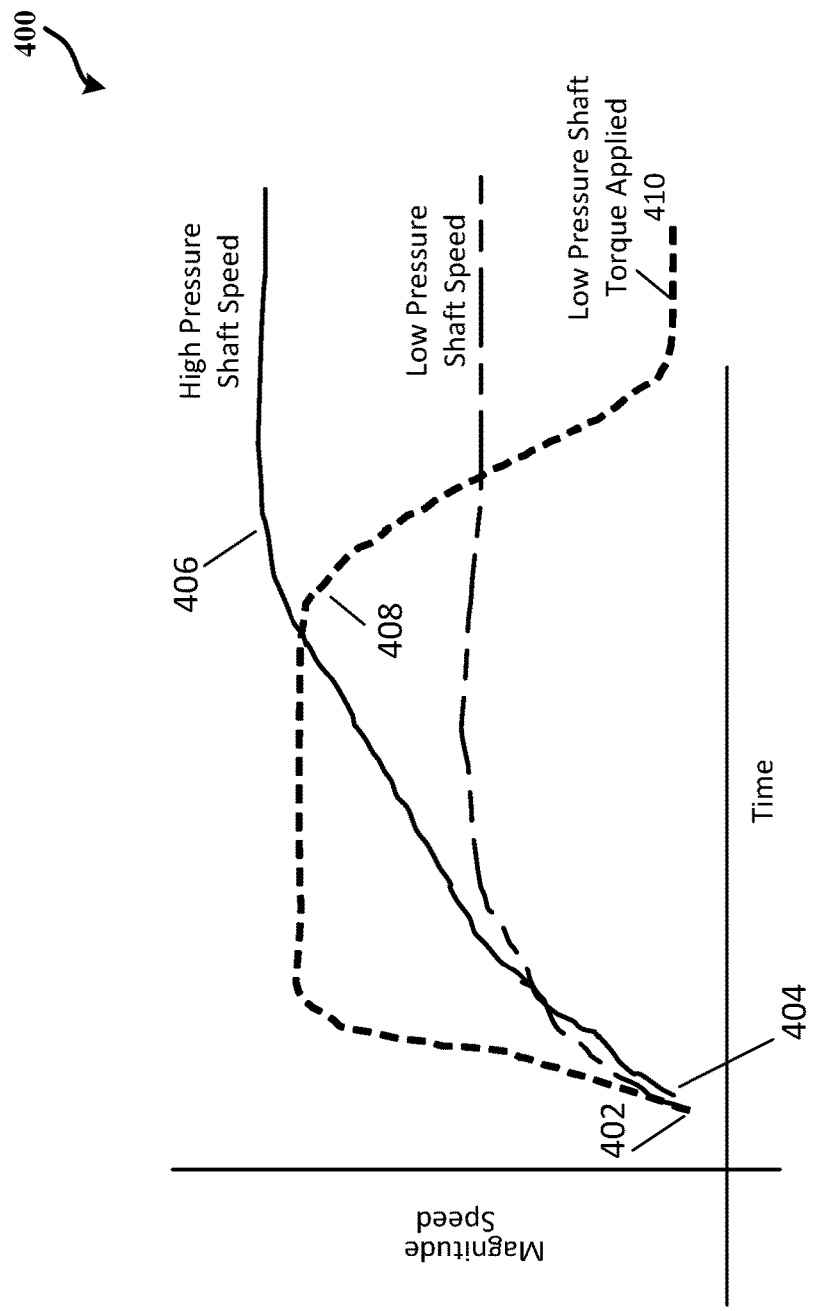
FIG. 4 is a diagram illustrating the exemplary speed of the LP shaft relative to speed of the HP shaft when a controller operates on a second starter motor to provide torque to the LP shaft according to some embodiments.

FIG. 4 is a diagram 400 illustrating the exemplary speed of the LP shaft 5055 relative to speed of the HP shaft 4045 when the controller 212 operates on the second starter motor 102 to provide torque to the LP shaft 5055 based on a base LP shaft torque schedule 410 according to some embodiments. In FIG. 4, at 402, the controller 212 causes torque to be applied to the LP shaft 5055 first (e.g., during an engine start). At a subsequent time and at 404, the controller 212 causes torque to be applied to the HP shaft 4045. For example, torque is applied to the HP shaft 4045 before, at about the same time, or after the application of torque to the LP shaft 5055 based on one or more predetermined or stored system level requirements and/or scenarios (e.g., default schedule or generally accepted default schedule for an aircraft engine). In some embodiments, proximate the time the idle speed of the HP shaft 4045 is reached at 406, the controller 212 causes the second starter motor 102 to start decreasing the torque applied to the LP shaft 5055 at 408. In some embodiments, the controller 212 start decreasing the torque applied to the LP shaft 5055 before the HP shaft 4045 reached its idle speed. One of the resulting benefits of a quicker start time (that is, the time the idle speed of the HP shaft 4045 is reached) of the engine (as compared to that of FIGS. 2 and 3) is an improved ground operations for airliners. Another benefit is an increased aircraft utilization for airliners.

Figure 5A:
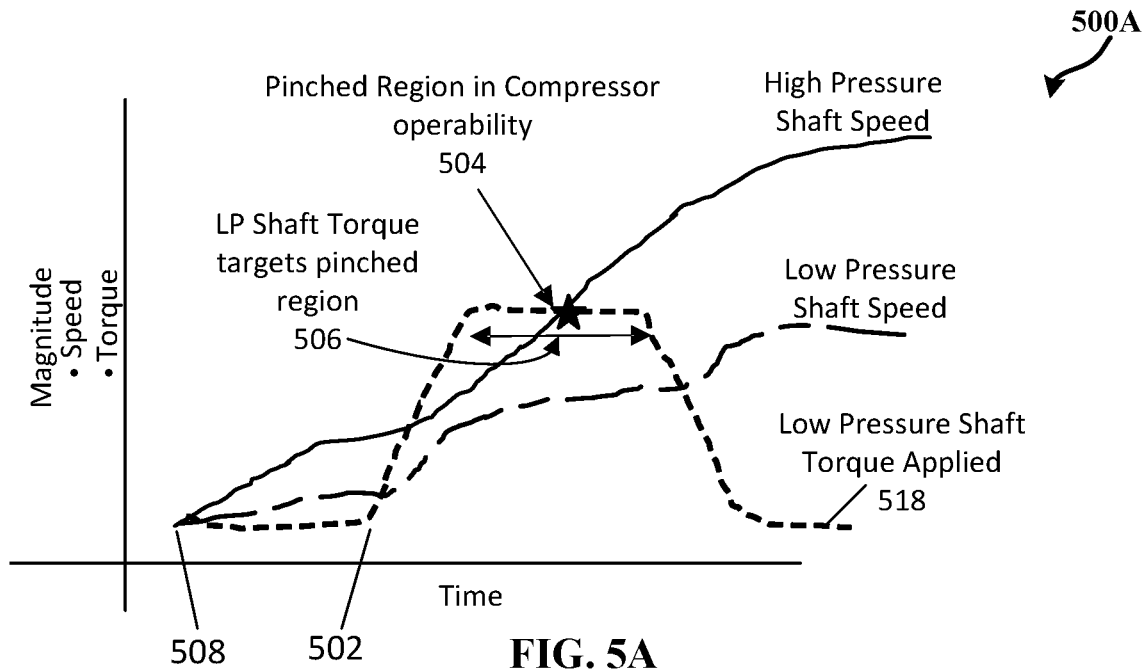
FIG. 5A is a diagram illustrating the exemplary speed of the LP shaft relative to speed of the HP shaft when a controller operates on a second starter motor to provide torque to the LP shaft according to some embodiments.
Figure 5B:
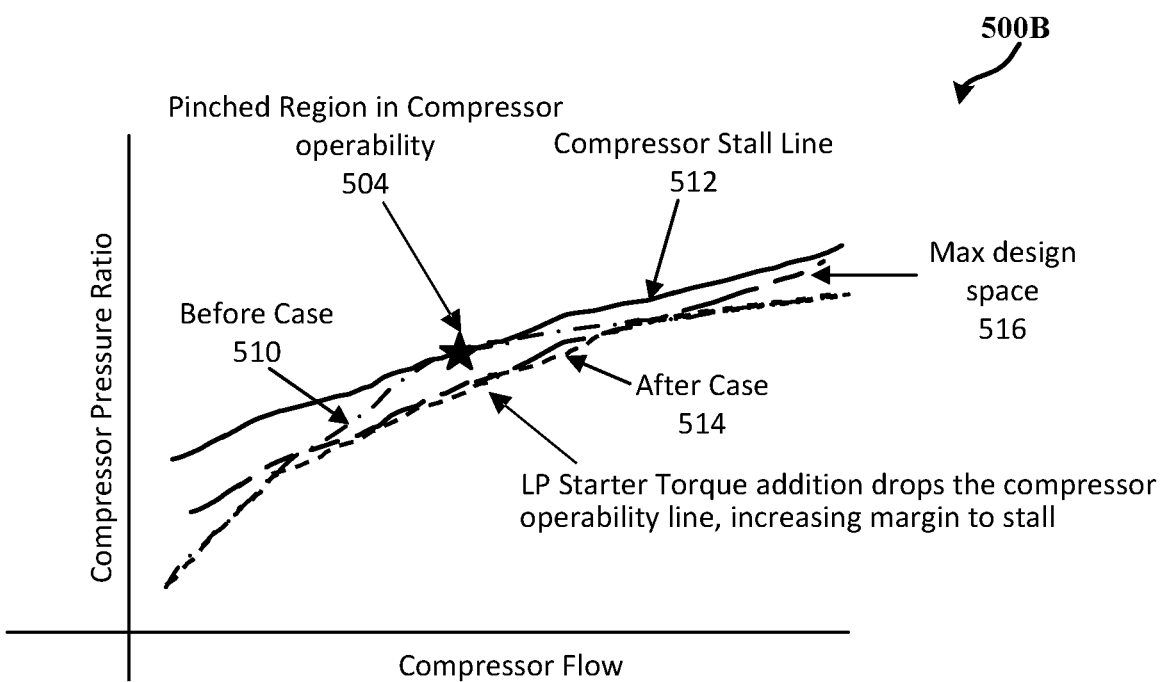
FIG. 5B is an exemplary compressor pressure ratio/compressor flow diagram corresponding to FIG. 5A according to some embodiments.

FIG. 5A is a diagram 500A illustrating the exemplary speed of the LP shaft 5055 relative to speed of the HP shaft 4045 when the controller 212 operates on the second starter motor 102 to provide torque to the LP shaft 5055 based on a base LP shaft torque schedule according to some embodiments. FIG. 5B is an exemplary compressor pressure ratio/compressor flow diagram 500B corresponding to FIG. 5A. In FIG. 5A, at 508, the controller 212 causes the first starter motor 101 to provide motive power to spin the HP shaft 4045 to start the engine 100. In response, the LP shaft 5055 may start rotating and/or accelerating based on the aerodynamic cycle driven by the rotation and/or acceleration of the HP shaft 4045. Subsequent to the application of torque to the first starter motor 101, at 502, the controller 212 causes torque to be applied to the LP shaft 5055. For example, torque may be applied to the LP shaft 5055 after the application of torque to the HP shaft 4045. In some embodiments, torque may be applied to the LP shaft 5055 at 10 seconds, 100 seconds, or anytime between 10-100 seconds after the application of torque to the HP shaft 4045 based on the engine and/or when the engine reaches a known compressor operability short fall (e.g., the pinched region in compressor operability 504 and/or any one of the pinched region described herein).

In some embodiment, the application of torque to the second starter motor 102 may be based on a LF shaft torque targets pinched region 506. In some embodiments, the LF shaft torque targets pinched region 506 is a threshold range from a known compressor operability short fall (e.g., the pinched region in compressor operability 504) on a compressor stall line 512. The compressor operability short fall may correspond to a particular time or a window of time that the engine is either prone to stall or has a high likelihood of stalling. In some embodiments, the base LP shaft torque schedule may be a function of speed (e.g., the LP shaft 5055 speed and/or the HP shaft 4045 speed, to name a few), torque of the first starter motor 101 and/or the second starter motor 102, airflow (e.g., generated by the rotation of the LP shaft 5055 and/or the HP shaft 4045, to name a few), and/or any particular setpoint (e.g., the pinched region in compressor operability 504) that may define the location of the point that needs the additional LP torque assistance.

In FIG. 5B, the engine's compressor pressure ratio/compressor flow line without the application of torque to the second starter motor 102 is shown at 'before case' 510. As shown, the 'before case' 510 intersects with the compressor operability short fall (e.g., the pinched region in compressor operability 504) indicating a likelihood of an engine stall during the startup operation of the engine. In some embodiments, the application of torque to the second starter motor 102 based on the LF shaft torque targets pinched region 506 drops the compressor operability line as shown by the 'after case' 514. In some embodiments, the dropping of the compressor operability line to the 'after case' 514 increases the margin to stall or the compressor operability margin. In some embodiments, the LF shaft torque targets pinched region 506 may be based on a desired maximum design space 516.

In some embodiments, the base LP shaft torque schedule includes a schedule that specifies when to increase (ramp up), maintain (plateau), and decrease (ramp down) the torque applied to the LP shaft 5055 in order to increase compressor operability margin (e.g., during on-ground start, in-flight start, to name a few). An illustrative non-limiting examples of the base LP shaft torque schedules are shown in FIGS. 3 (e.g., the low pressure shaft torque applied 310), 4 (the low pressure shaft torque applied 410), 5A (the low pressure shaft torque applied 518), 6A (the low pressure shaft torque applied 618), 7B (the low pressure shaft torque applied 710), 8A (e.g., the low pressure shaft torque applied 820, which may include the "base" LP shaft torque schedule 802 and/or the adaptive LP shaft torque 804), and 11 (the LP starter torque 1108). For example, the base LP shaft torque schedule may include the LF shaft torque targets pinched region 506. In some embodiments, the application of torque to the second starter motor 102 based on the LF shaft torque targets pinched region 506 as shown in FIG. 5A provides additional torque or speed to the LP shaft 5055 resulting in more flow and/or pressure at the compressor inlet (e.g., the inlet 1058), which increases the stall margin or compressor operability margin in this region. In some embodiments, the controller 212 may take a desired start trajectory from a pilot and/or preprogrammed selection and determine an optimum LP torque starting profile based on one or more of base LP shaft torque schedules described herein.

In some embodiments, the combination of the ramp up, plateau, and ramp down of the base LP shaft torque schedule may reduce the electrical power required from the second starter motor 102 to provide torque to the LP shaft 5055. Thus, the application of torque to the second starter motor 102 may be particularly designed to target a particular time or window of time in the compressor operability line of the engine that may require updating. For example, the controller 212 may target or particularly apply torque to the second starter motor 102 only in the un-healthy region of the compressor operability line of the engine (e.g., the pinched region in compressor operability 504). For example, the un-healthy region of the compressor operability line of the engine may be based on known data particular to the engine. For example, the controller 212 may receive sensor data from one or more sensors of an aircraft. In response to processing the received sensor data, the controller 212 may determine that the engine is at and/or about to enter the un-healthy region of the compressor operability line. In some embodiments, in response to the determination that the engine is at and/or about to enter the un-healthy region of the compressor operability line, the controller 212 may execute an LP shaft torque schedule, such as the low pressure shaft torque applied 518 and/or one or more of the base LP shaft torque schedules described herein, and cause the second starter motor 102 to receive a signal prompting the second starter motor 102 to provide torque to the LP shaft 5055. In some embodiments, the second starter motor 102 may be driven by compressed air or electricity. In some embodiments, the controller 212 may determine which one of the base LP shaft torque schedules to execute based on a particular gas turbine engine. For example, a base LP shaft torque schedule may be associated with one or more gas turbine engines.

Figure 6A:
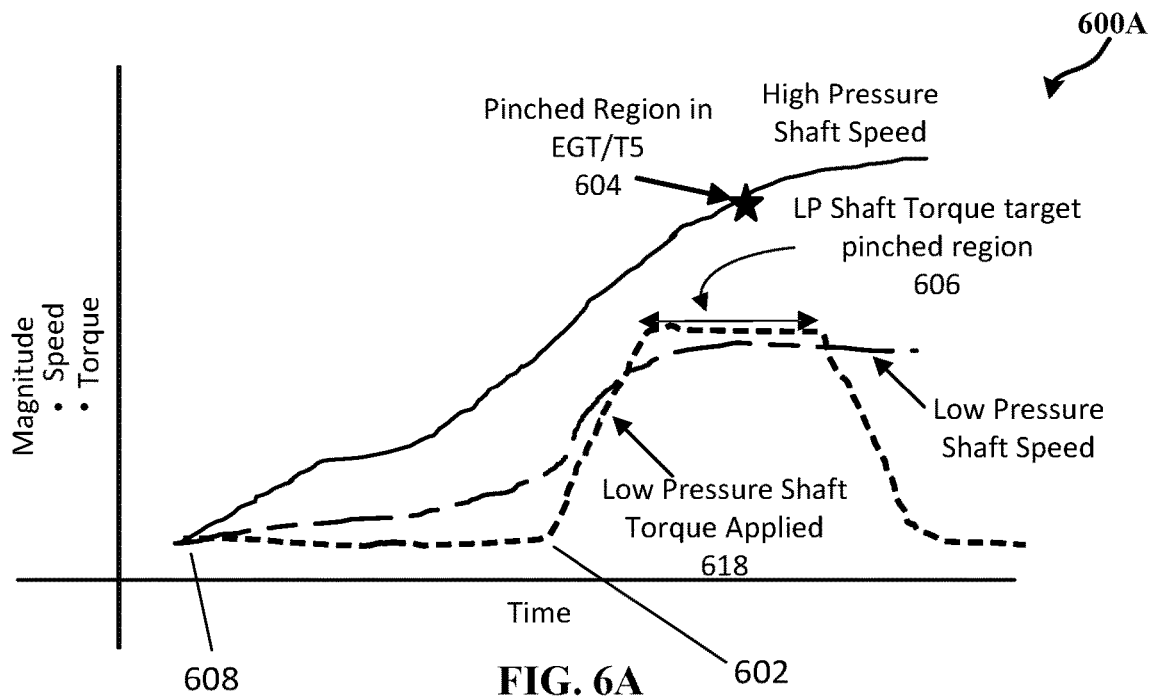
FIG. 6A is a diagram illustrating the exemplary speed of the LP shaft relative to speed of the HP shaft when a controller operates on a second starter motor to provide torque to the LP shaft according to some embodiments.
Figure 6B:
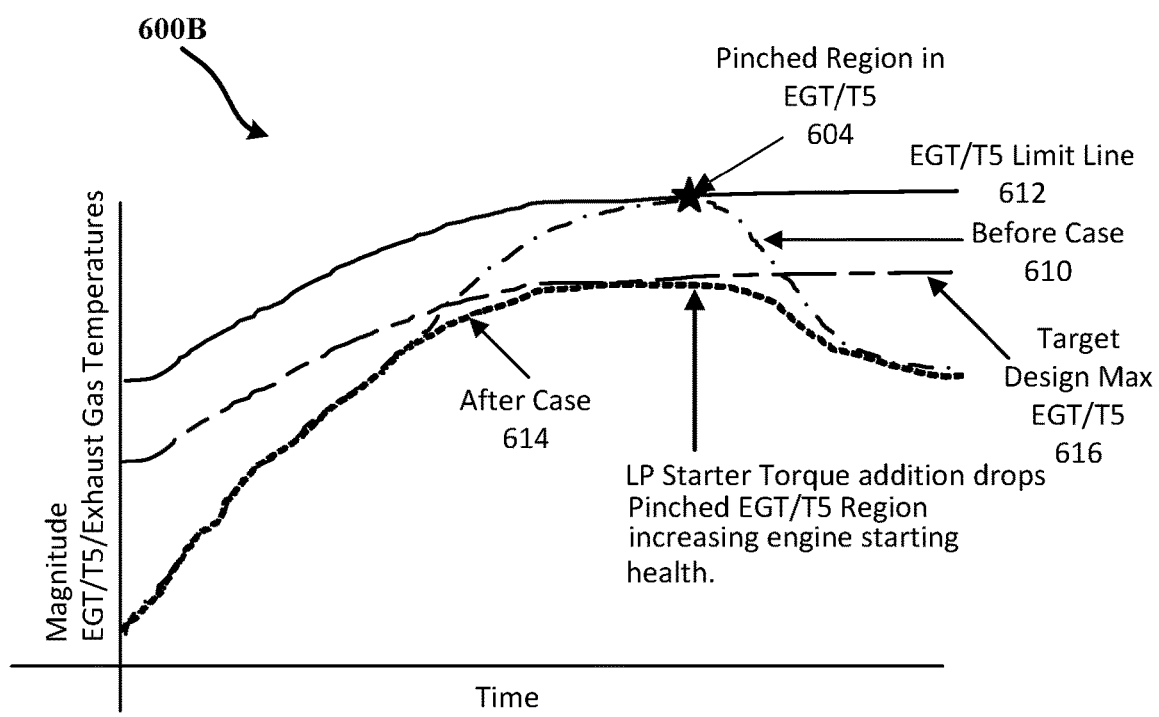
FIG. 6B depicts a diagram of exemplary EGT/T5/Exhaust gas temperatures corresponding to FIG. 6A according to some embodiments.

FIG. 6A is an exemplary diagram 600A illustrating the speed of the LP shaft 5055 relative to speed of the HP shaft 4045 when the controller 212 operates on the second starter motor 102 to provide torque to the LP shaft 5055 based on a base LP shaft torque schedule according to some embodiments. FIG. 6B depicts a diagram 600B of exemplary EGT/T5/Exhaust gas temperatures corresponding to FIG. 6A according to some embodiments. In some embodiments, in response to the controller 212 receiving data corresponding to an indication that a ratio of an exhaust gas temperature (EGT) to an EGT target set point is greater than a threshold, the controller 212 may operate the second starter motor 102 to provide additional torque to the LP shaft 5055 based on a high EGT ratio LP shaft torque schedule (e.g., the LP shaft torque applied 618). For example, the high EGT ratio shaft torque schedule may include a schedule on when to increase, maintain, and decrease the additional torque applied to the LP shaft 5055 in order to increase the EGT temperature margin.

In some embodiment, the base LP shaft torque schedule (e.g., the high EGT ratio shaft torque schedule) may be a function of speed (e.g., the LP shaft 5055 speed and/or the HP shaft 4045 speed, to name a few), torque of the first starter motor 101 and/or the second starter motor 102, airflow (e.g., generated by the rotation of the LP shaft 5055 and/or the HP shaft 4045, to name a few), and/or any particular setpoint (e.g., the pinched region in EGT/T5 604) that may define the location of the point that needs the additional LP torque assistance.

To illustrate, in FIG. 6A, at 608, the controller 212 causes the first starter motor 101 to provide motive power to spin the HP shaft 4045 to start the engine 100. In response, the LP shaft 5055 may start rotating and/or accelerating based on the aerodynamic cycle driven by the rotation and/or acceleration of the HP shaft 4045. Subsequent to the application of torque to the first starter motor 101, the controller 212 causes torque to be applied to the LP shaft 5055. For example, at 602, torque may be applied to the LP shaft 5055 after the application of torque to the HP shaft 4045. In some embodiments, torque may be applied to the LP shaft 5055 at 20 seconds, 100 seconds, or any time between 20-100 seconds after the application of torque to the HP shaft 4045. In some embodiments, the LP starter motor 102 provides additional torque in and around a pinch point region around starter cutout. The starter cutout may correspond to a point in which the HP starter motor 101 stops providing torque, but the engine is not at idle yet. For example, this is when engine thermals during the start tend to be high (e.g., progression region between starter cutout and idle). In some embodiments, the pinch point region may include one or more pinched regions described herein. In some embodiments, different designed engines may have different thermal pinch points. As such, the LP shaft torque schedule may be based on observations and/or gathered data from running the engine.

In some embodiments, the application of torque by the second starter motor 102 to the LP shaft 5055 may be based on a LF shaft torque target pinched region 606. In some embodiments, the LF shaft torque target pinched region 606 is a threshold range from a known compressor operability short fall (e.g., the pinched region in EGT/T5 604) on EGT/T5 limit line 612. The compressor operability short fall may correspond to a particular time or a window of time that the engine is either prone to stall or has a high likelihood of stalling.

In FIG. 6B, the engine's EGT/T5/Exhaust gas temperatures diagram without the application of torque to the LP shaft 5055 by the second starter motor 102 is shown at 'before case' 610. As shown, the 'before case' 610 intersects with the compressor operability short fall (e.g., the pinched region in EGT/T5 604) indicating a likelihood of an engine stall during the startup operation of the engine. In some embodiments, the application of torque to the LP shaft 5055 by the second starter motor 102 based on the LF shaft torque targets pinched region 606 drops the compressor operability line as shown by the 'after case' 614. In some embodiments, the dropping of the compressor operability line to the 'after case' 614 increases the margin to stall or the compressor operability margin. In some embodiments, the LF shaft torque targets pinched region 606 may be based on a desired maximum design space EGT target set point (e.g., target design max EGT/T5 616).

In some embodiments, the base LP shaft torque schedule includes a schedule on when to increase (ramp up), maintain (plateau), and decrease (ramp down) the torque applied to the LP shaft 5055 in order to increase compressor operability margin. In an illustrative non-limiting example, in FIG. 6A, the base LP shaft torque schedule may include the LF shaft torque targets pinched region 606. In some embodiments, the application of torque to the LP shaft 5055 by the second starter motor 102 based on the LF shaft torque targets pinched region 606 as shown in FIG. 6A provides additional torque or speed to the LP shaft 5055 resulting in more flow and/or pressure at the compressor inlet (e.g., the inlet 1058), which increases the stall margin or compressor operability margin in this region. In some embodiments, the combination of the ramp up, plateau, and ramp down of the base LP shaft torque schedule may reduce the electrical power required of the second starter motor 102 to provide torque to the LP shaft 5055. Thus, the application of torque to the LP shaft 5055 by the second starter motor 102 may be particularly designed to target a particular time or window of time in the compressor operability line of the engine that may require updating. For example, the controller 212 may target or particularly cause torque to be applied to the LP shaft 5055 by the second starter motor 102 only in the un-healthy region of the compressor operability line of the engine (e.g., the pinched region in compressor operability 504). For example, the un-healthy region of the compressor operability line of the engine may be based on known data particular to the engine.

Figure 7A:
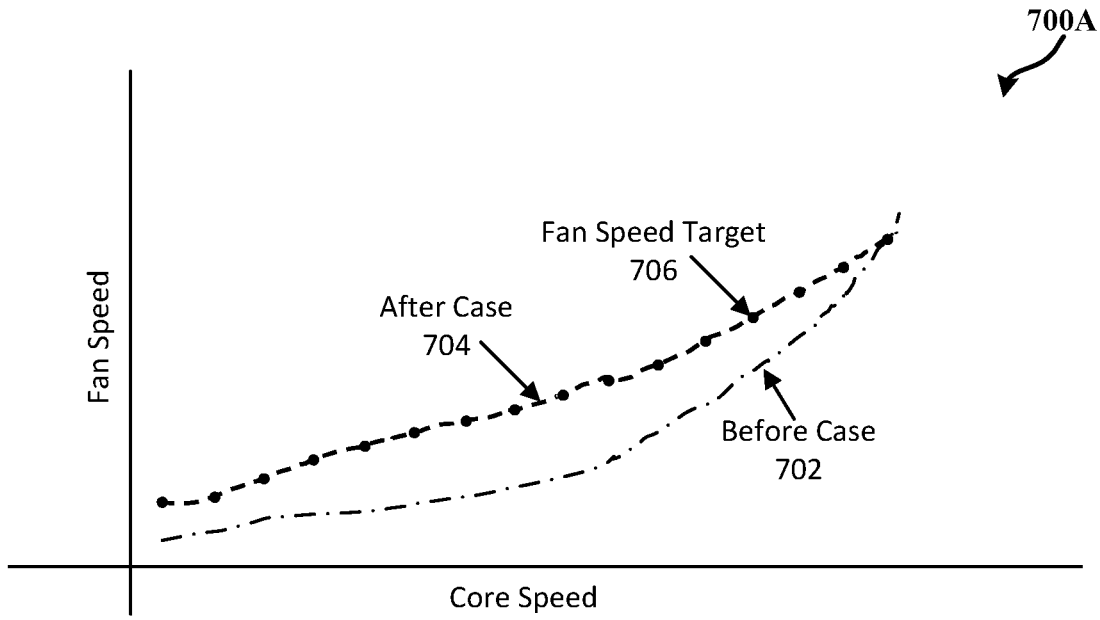
FIG. 7A is a diagram illustrating an exemplary effect to the speed of the HP shaft when torque is provided to the LP shaft according to some embodiments.
Figure 7B:
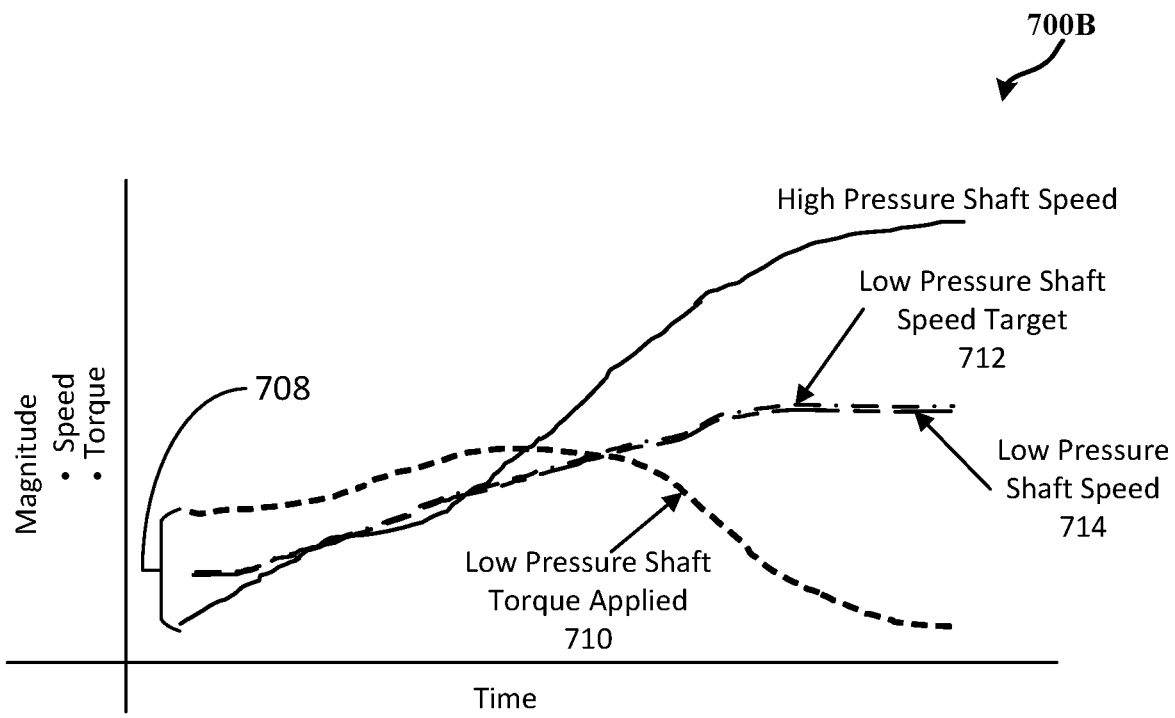
FIG. 7B is a diagram illustrating the exemplary speed of the LP shaft relative to the corresponding speed of the HP shaft in FIG. 7A according to some embodiments.

FIG. 7A is an exemplary diagram 700A illustrating an exemplary effect to the speed of the HP shaft 4045 when torque is provided to the LP shaft 5055 according to some embodiments. FIG. 7B is an exemplary diagram 700B illustrating the speed of the LP shaft 5055 relative to the corresponding speed of the HP shaft 4045 in FIG. 7A according to some embodiments. In some embodiments, there may be an ideal relationship between HP air flow to fan air flow. In an illustrative non-limiting example, the controller 212 may use the core speed and fan speed as a proxy to the HP air flow to fan air flow, respectively. For example, for a given core speed, the controller 212 may determine the desired fan speed. In such example, the controller 212 may set torque to have fan speed match the desired fan speed (which is a function of current core speed).

To illustrate, in FIG. 7A, at 702, the controller 212 causes the first starter motor 101 to provide motive power to spin the HP shaft 4045 to start the engine 100 without providing torque to the LP shaft 5055. In some embodiments, at 708, the controller 212 causes both the first starter motor 101 to provide torque to the HP shaft 4045 and the second starter motor 102 to provide torque to the LP shaft 5055. In some embodiments, the base LP shaft torque schedule may include torque schedule corresponding to LP shaft torque applied 710 shown in FIG. 7B. In some embodiments, the base LP shaft torque schedule includes a schedule (e.g., the LP shaft torque applied 710) on when to increase, maintain, and/or decrease the torque applied to the LP shaft 5055 in order to match a speed of the LP shaft 5055 with a target speed of the LP shaft 5055 within a threshold. In some embodiments, the application of the base LP shaft torque schedule may allow the speed of the HP shaft 4045 to be matched within a threshold of the fan speed target 706 shown as After Case 704 in FIG. 7A. In some embodiments, the application of the base LP shaft torque schedule may allow the speed 714 of the LP shaft 5055 to be matched within a threshold of the LP shaft speed target 712 shown in FIG. 7B.

In some embodiments, the base LP shaft torque schedule (e.g., the LP shaft torque applied 710 schedule) may be a function of airflow generated by the rotation of the HP shaft 4045. For example, the controller 212 may determine the required speed of the LP shaft 5055. Based on the determined required speed of the LP shaft 5055, the controller 212 may determine the LP shaft torque applied 710 schedule to achieve the fan speed target 706.

Figure 8A:
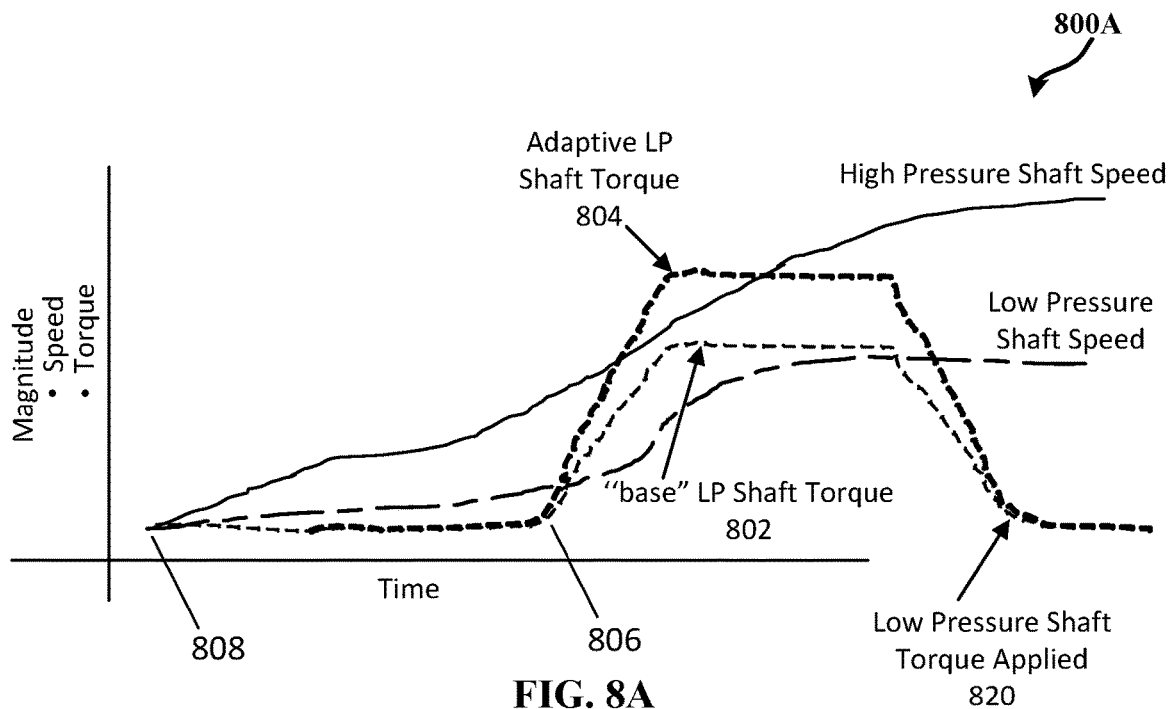
FIG. 8A is a diagram illustrating the exemplary speed of the LP shaft 5055 relative to speed of the HP shaft 4045 when the controller 212 operates on the second starter motor 102 to provide torque to the LP shaft 5055 according to some embodiments.
Figure 8B:
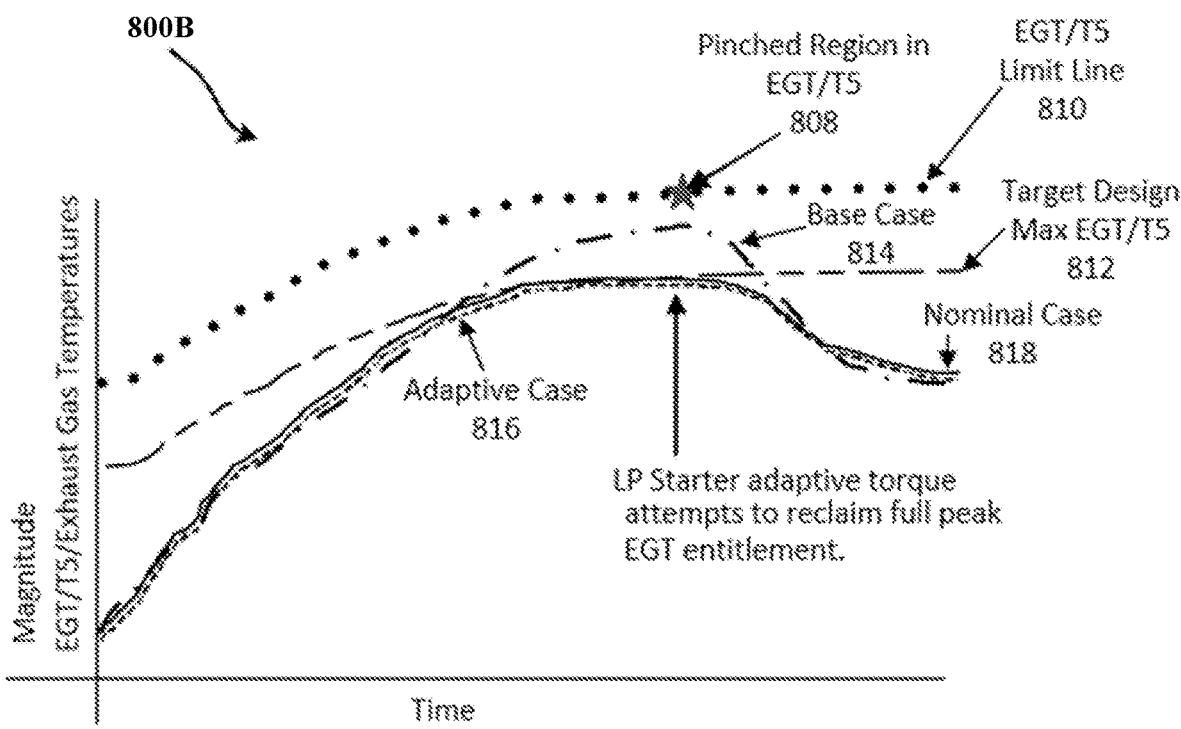
FIG. 8B depicts a diagram of exemplary EGT/T5/Exhaust gas temperatures corresponding to FIG. 8A according to some embodiments.

FIG. 8A is an exemplary diagram 800A illustrating the speed of the LP shaft 5055 relative to speed of the HP shaft 4045 when the controller 212 operates on the second starter motor 102 to provide torque to the LP shaft 5055 based on a base LP shaft torque schedule according to some embodiments. FIG. 8B is an exemplary EGT/T5/Exhaust gas temperatures diagram 800B corresponding to FIG. 8A according to some embodiments. In some embodiments, the controller 212 may adaptively modify the base LP shaft torque schedule 802 to correspond to the adaptive LP shaft torque 804 in response to an indication that a ratio of an exhaust gas temperature (EGT) to an EGT target is greater than a threshold. In some embodiment, the base LP shaft torque schedule 802 may be applied by the controller 212 when the first starter motor 101 may not be performing as expected by the controller 212. In such embodiments, the controller 212 may cause the second starter motor 102 to apply torque in a wider band and/or additional torque up to a predetermine maximum limit.

For example, the applied torque may be allowed to vary from a nominal torque schedule (e.g., the base LP shaft torque schedule) to protect constraints up to a predetermined amount that protects mechanical constraints on both the HP and LP starter motors 101, 102 (for example, either the HP starter motor 101 or LP starter motor 102 may be an electric machine). For example, a motor generator maximum torque may be 100 horsepower (HP), the aircraft supplies electrical power to sufficiently supply a 100 HP of torque, and the base LP shaft torque schedule applies 50 HP of torque. In such example, the controller 212 in executing an adaptive cycle (e.g., a resulting adaptive LP shaft torque 804) may not allow more than 100 HP of torque (50 base+50 adaptive) due to the motor cannot supply more than 100 HP of torque.

In another example, a motor generator maximum torque may be 100 HP, the aircraft supplies electrical power to sufficiently supply a 80 HP of torque, and the base LP shaft torque schedule applies 50 HP of torque. In such example, the controller 212 in executing an adaptive cycle may not allow more than 80 HP of torque (50 base+30 adaptive) due to the aircraft cannot supply enough electrical power to have the motor produce more than 80 HP.

In an illustrative non-limiting example, in FIG. 8A, at 808, the controller 212 may cause the first starter motor 101 to provide motive power to spin the HP shaft 4045 to start the engine 100. In response, the LP shaft 5055 may start rotating and/or accelerating based on the aerodynamic cycle driven by the rotation and/or acceleration of the HP shaft 4045. Subsequent to the application of torque to the HP shaft 4045 by the first starter motor 101, the controller 212 may cause torque to be applied to the LP shaft 5055 by the second starter motor 102. For example, at 806, torque may be applied to the LP shaft 5055 after the application of torque to the HP shaft 4045. In some embodiments, torque may be applied to the LP shaft 5055 anywhere between 0 to 60 seconds after the application of torque to the HP shaft 4045. In some embodiments, torque may be applied to the LP shaft 5055 anywhere from 0 until the engine reaches idle.

In some embodiments, the application of torque to the LP shaft 5055 by the second starter motor 102 may be based on a pinched region in EGT/T5 808. In some embodiments, the pinched region in EGT/T5 808 may include a particular value or a threshold range from a known compressor operability short fall.

In FIG. 8B, at base case 814, the controller 212 operates on the second starter motor 102 to provide torque to the LP shaft 5055 based on a base LP shaft torque schedule 802. In some embodiments, the controller 212 may subsequently apply one or more adders, multipliers, and/or bias to the base LP shaft torque schedule 802 after the application of the base LP shaft torque schedule 802. For example, the resulting LP shaft torque schedule that may be applied correspond to the adaptive LP shaft torque 804. For example, the one or more adders, multipliers, and/or bias may be applied after the application of the base LP shaft torque schedule 802. In some embodiments, torque may be applied to the LP shaft 5055 anywhere between 0 to 60 seconds after the application of torque to the HP shaft 4045. In some embodiments, torque may be applied to the LP shaft 5055 anywhere from 0 until the engine reaches idle.

In some embodiment, the adaptive LP shaft torque 804 may include applying predefined adders, multipliers, and/or bias upon the controller 212 detecting one or more abnormal scenarios. For example, if the controller 212 detects a shortfall in the HP starter and the engine 100 may be running hotter relative to an average run temperature during an EGT/T5 thermal pinch point, the controller 212 may bias the base LP shaft torque schedule 802 to provide more assistance. In some embodiments, the base case 814 may run closer to the EGT/T5 Limit line 810. In some embodiments, for the adaptive case 816, the controller 212 may maintain the same compressor operability margin as for a nominal start case 818. For example, a nominal start case 818 is one where the HP starter motor 101 may be functioning as expected and outputting the desired torque/air pressure into the HP compressor 4042 and/or EGT temperatures are normal (e.g., between 660 Celsius and 1000 Celsius). In some embodiments, a nominal start case may correspond to one expected by the controller 212 (a default case or a default value or range of values, or what is customary in the particular engine of the aircraft, to name a few). In some embodiments, there are many factors that may drive the engine to not behave as expected. For example, maintenance issues, engine deterioration, lower starter air pressure/electrical supply(s), environmental effects (temperature, altitude, etc.), how long the engine has been shut down for, and the thermal state of the engine prior to shut down and restart, to name a few.

In some embodiments, the controller 212 may not allow the second starter motor 102 to exceed its capability. For example, the controller 212 may 'max' select between the final 'bias' schedule and the capability of the second starter motor 102. For example, the capability may be limited as a predetermined maximum torque in Newton-Meters or a predetermined maximum power in Kilowatts. In some embodiments, the controller 212 may not allow the second starter motor 102 to demand more electrical power than can be supplied. In some embodiments, the controller 212 may calculate to use a 'failsafe' or 'default' schedule versus just applying adders, multipliers, and/or bias.

Figure 9A:
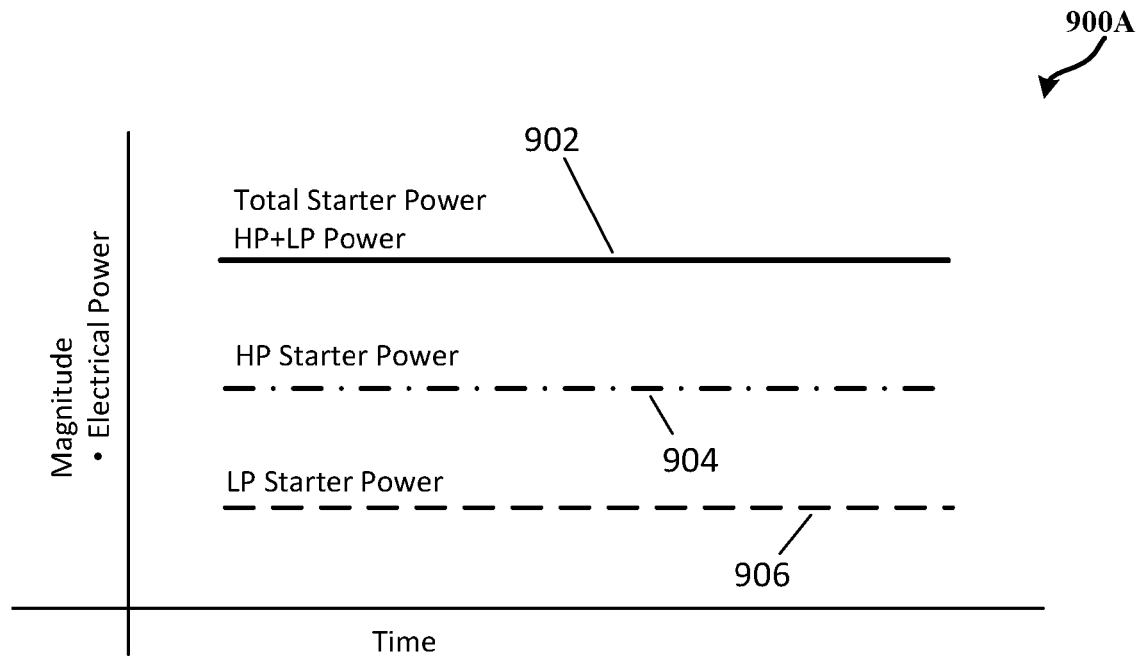
FIG. 9A depicts a diagram of exemplary power demands when supplied electrical demand is unlimited according to some embodiments.
Figure 9B:
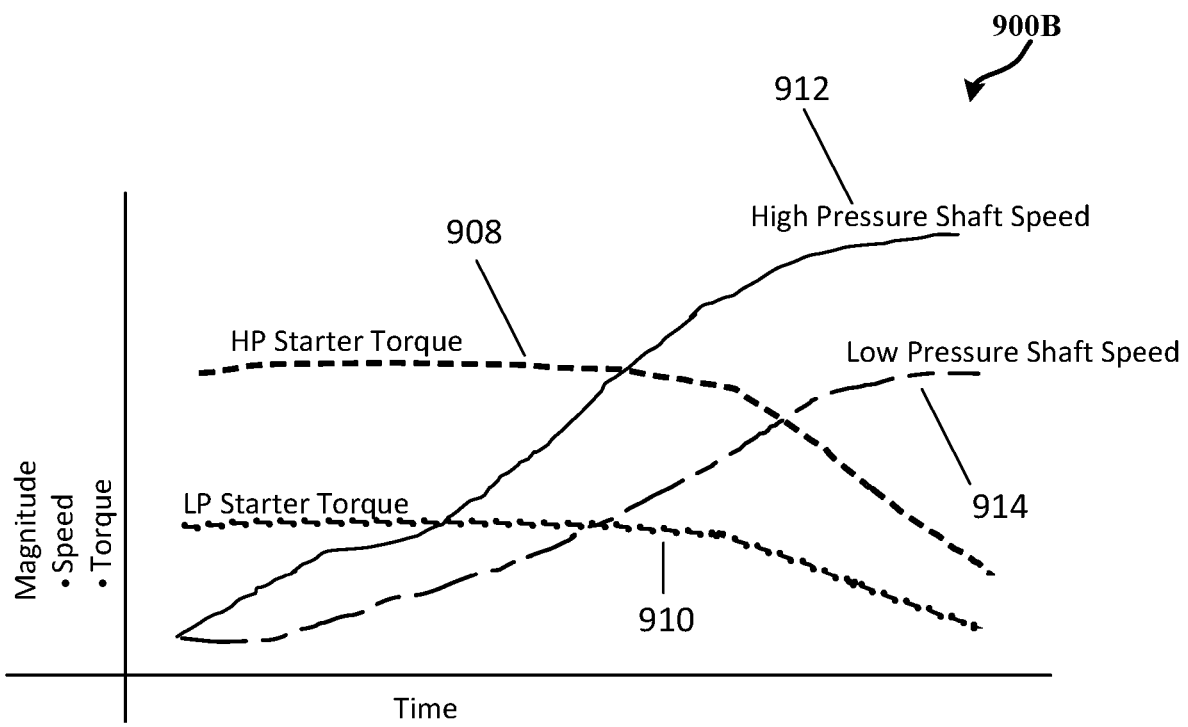
FIG. 9B depicts a diagram of exemplary applied torques and shaft speeds corresponding to FIG. 9A according to some embodiments.

FIG. 9A depicts exemplary power demands diagram 900A when supplied electrical demand is unlimited according to some embodiments. FIG. 9B depicts a diagram 900B of exemplary applied torques and shaft speeds corresponding to FIG. 9A according to some embodiments. In some embodiments, in FIG. 9A, if the supplied electrical demand 902 were unlimited, the first starter motor 101 and the second starter motor 102 can demand up to their corresponding power ratings (e.g., HP Starter Power 904, LP Starter Power 906). In an illustrative non-limiting example, the corresponding applied torques (e.g., HP Starter Torque 908, LP Starter Torque 910) and their resulting respective shaft speeds (e.g., HP shaft speed 912, LP shaft speed 914) of the first starter motor 101 and the second starter motor 102, respectively are shown in FIG. 9B. However, in most engine environment (e.g., during on-ground start, in-flight start, to name a few), prioritization between the first starter motor 101 and the second starter motor 102 may be determined by the controller 212, such as shown in FIGS. 10A-10B.

Figure 10A:
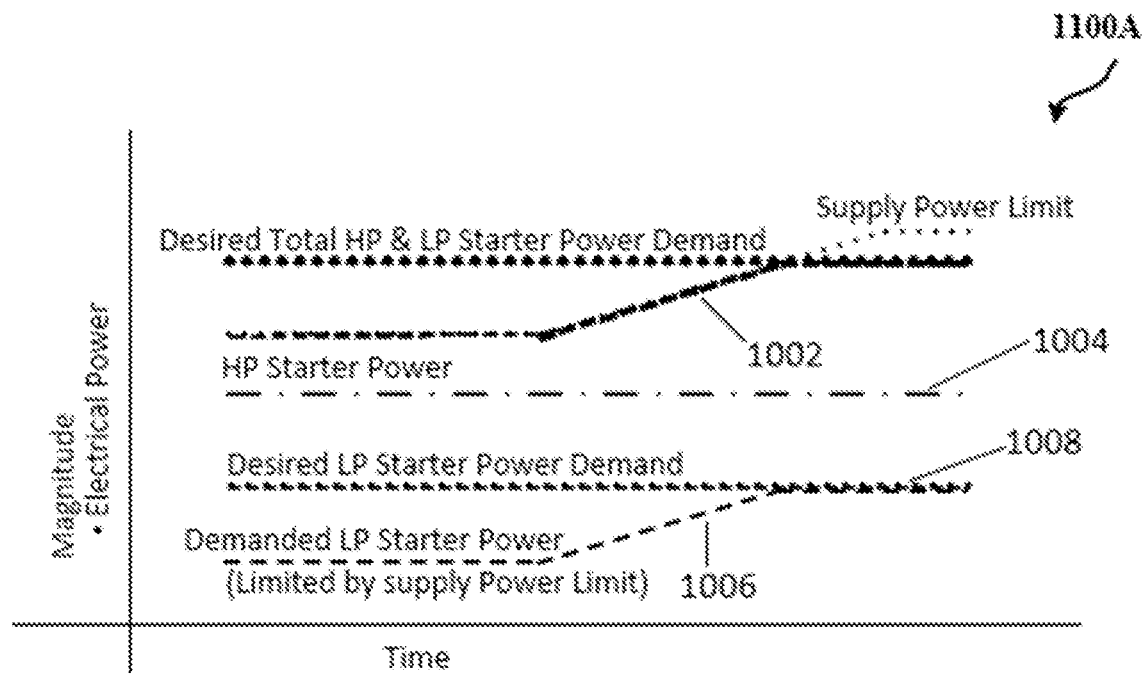
FIG. 10A depicts a diagram of exemplary power demands when supplied electrical demand is limited according to some embodiments.

FIG. 10A depicts exemplary power demands diagram 1000A when supplied electrical demand is limited according to some embodiments. FIG. 10B depicts a diagram 1000B of exemplary applied torques and shaft speeds corresponding to FIG. 10A according to some embodiments. In some embodiments, the controller 212 may detect that a required total power to provide respective torque to each of the HP shaft and the LP shaft is greater than a total supplied power by the first starter motor and the second starter motor. In a response, the controller 212 may prioritize the first starter motor 101 in power allocation until a speed or power of the HP shaft 4045 matches a target speed or power of the HP shaft 4045 within a threshold. In an illustrative non-limiting example, in FIG. 10A, if the supplied electrical demand 1002 is limited, the first starter motor 101 can demand up to its power rating 1004. The power demand of the first starter motor 101 may be prioritized before the power demand of the second starter motor 102. For example, at 1006, the power demanded by the second starter motor 102 may be limited based on the supplied electrical demand 1002. In such embodiments, once the supplied power is high enough, the second starter motor 102 can demand the desired LP starter power 1008. In some embodiments, once all power demanded by the first starter motor 101 is supplied, any remaining power can be demanded by the second starter motor 102.

Figure 10B:
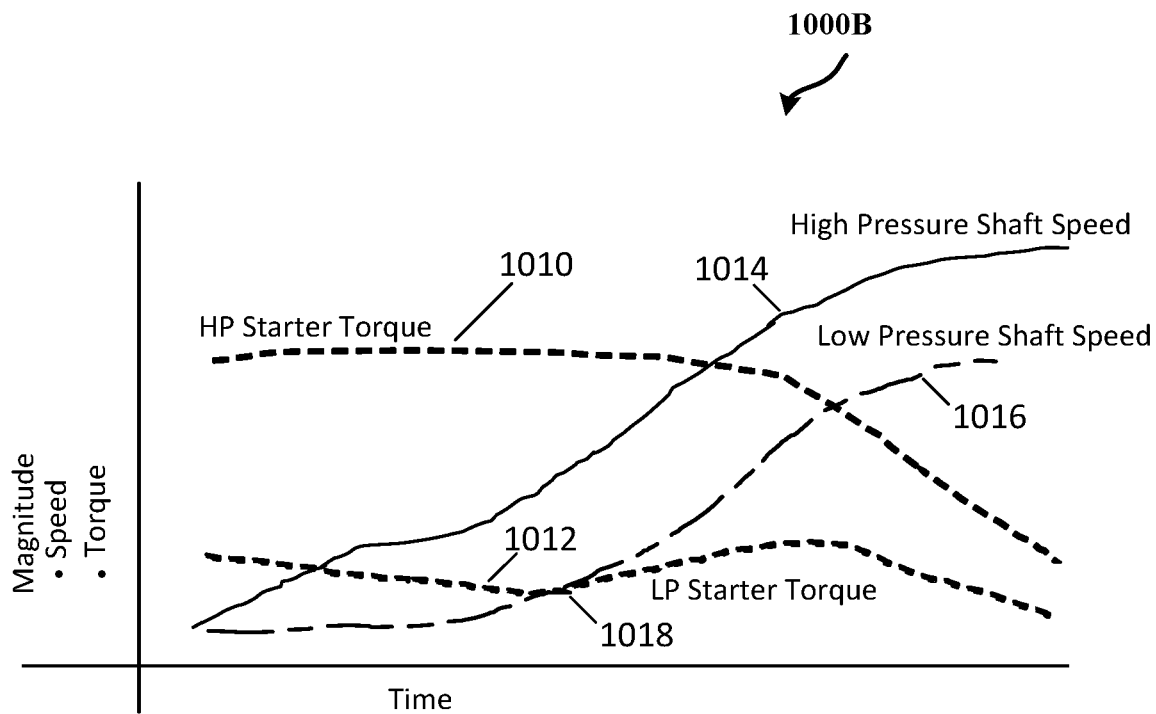
FIG. 10B depicts a diagram of exemplary applied torques and shaft speeds corresponding to FIG. 10A according to some embodiments.

In an illustrative non-limiting example, the corresponding applied torques (e.g., HP Starter Torque 1010, LP Starter Torque 1012) and their resulting respective shaft speeds (e.g., HP shaft speed 1014, LP shaft speed 1016) of the first starter motor 101 and the second starter motor 102, respectively are shown in FIG. 10B. At 1018, a dip is shown in the corresponding applied torque provided by the second starter motor 102 to the LP shaft 5055 at a point in time when the power demanded by the second starter motor 102 is limited. In some embodiment, the controller 212 may calculate the desired torque insertion or addition between the HP shaft 4045 and the LP shaft 5055 to account for start time, operability, engine thermals (i.e., peak temperatures), and/or vibration, to name a few based on one or more embedded models of the HP and LP systems.

In some embodiments, the controller 212 may determine an additional torque to apply to at least one of the HP shaft 4045 or the LP shaft 5055 or both using one or more embedded models based on one or more of engine start time, operability margins, engine thermals, and/or vibration. For example, one or more embedded models may account for HP torque needed to start the core shaft (e.g., the HP shaft 4045) as well as the LP torque needed for assistance. In some embodiments, the one or more embedded models and/or one or more base LP shaft torque schedules described herein may be stored in the memory 214.

In some embodiments, an embedded model may refer to some physics based—typically high fidelity—model that is running inside of a FADEC controller simulating all parts of the engine including pressures, temperatures, etc. at each station along the engine. In some embodiments, this embedded model can act like a "Digital Twin" where tracking filters update the model to match the given engine the controller 212 is on or associated with. This model can then be used to extrapolate relationships between the HP and LP starter motors 101, 102 and the expected speeds, temperatures, etc. and can be used to optimally schedule the applied torques.

In some embodiments, if another engine (not shown) is to be started, another controller (not shown) associated with the other engine may demand additional power off engine 100. For example, in response to starting the gas turbine engine (e.g., the engine 100), the controller 212 may detect that other gas turbine engine is yet to be started. In some embodiments, the engine 100 may provide supplemental electrical power to help assist starting the other engine. For example, in response to detecting that the other gas turbine engine is yet to be started, the controller 212 may allocate at least a portion of the total supplied power of at least one of the first starter motor 101 or the second starter motor 102 or both to start the other gas turbine engine.

Figure 11:
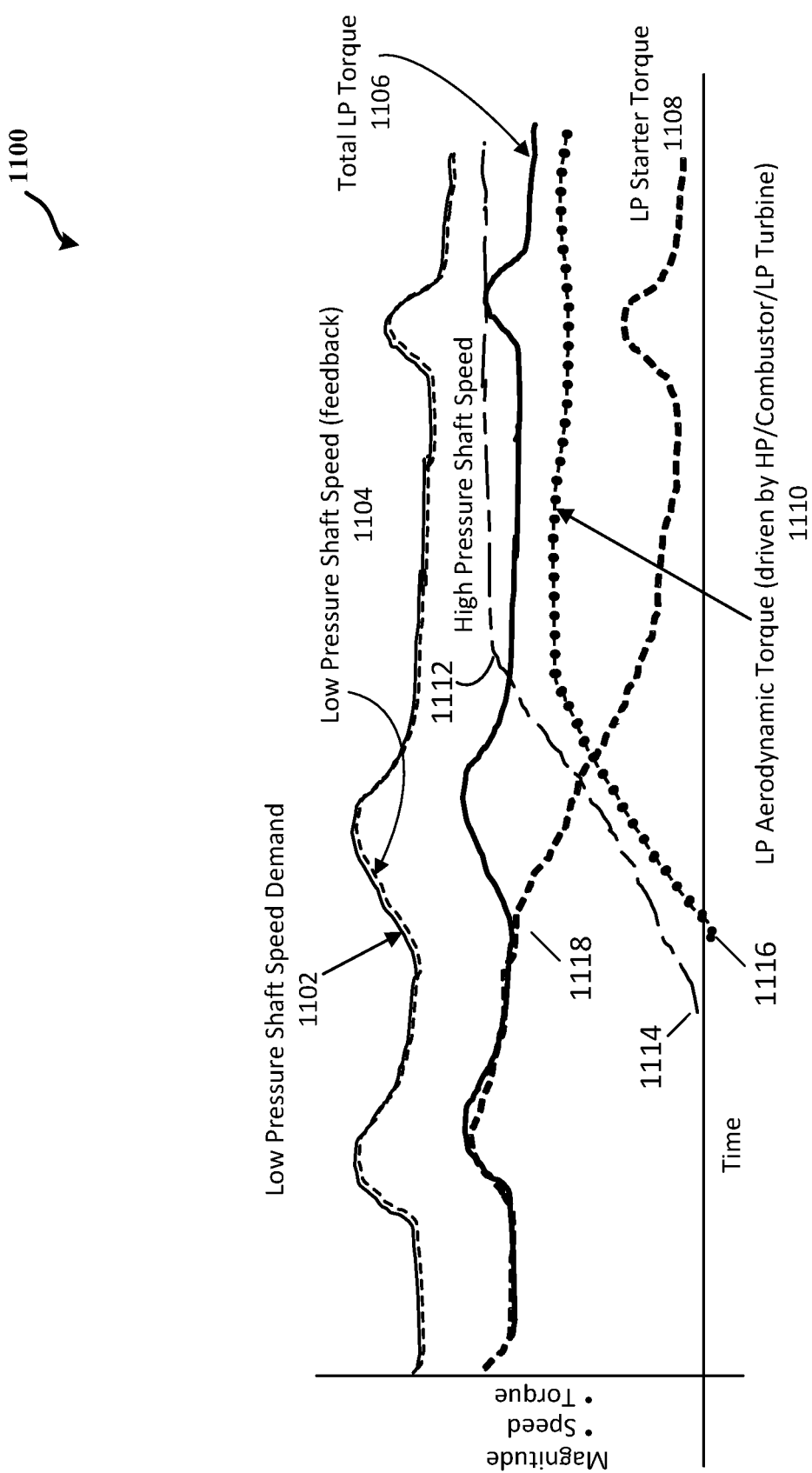
FIG. 11 depicts a diagram illustrating the exemplary speed of the LP shaft 5055 relative to speed of the HP shaft 4045 during an electric taxi start scenario according to some embodiments.

FIG. 11 depicts an exemplary diagram 1100 illustrating the speed of the LP shaft 5055 relative to speed of the HP shaft 4045 during an electric taxi start scenario based on a base LP shaft torque schedule (e.g., the LP starter torque 1108) according to some embodiments. In some embodiments, an electric taxi is a form of taxi that an aircraft can do with just utilizing the aerodynamic coupling that occurs when torque is only provided to the second starter motor 102 and not the first starter motor 101. In such embodiments, the resulting aerodynamic coupling provides sufficient torque into the fan shaft or the HP shaft 4045 to generate sufficient thrust to move the aircraft. For example, the base LP shaft torque schedule may include a first schedule on when to increase, maintain, and/or decrease the torque applied to the LP shaft 5055 in order to generate sufficient thrust to move an aircraft during an electric taxi on a runway, and a second schedule on when the torque applied to the HP shaft 4045 is provided by the first starter motor 101 relative the first schedule.

In an illustrative non-limiting example, to further enhance ground operations (e.g., reduce ground time), one or more engines of the aircraft may be started during an electronic ground taxi scenario. For example, the engine 100 may perform an enhanced start while the LP rotor of the LP compressor is at a taxi thrust setting, which enables engine start while the aircraft is in motion (i.e., taxiing to the runway).

In an illustrative non-limiting example, the HP shaft 4045 and/or the core engine 40 may be started during the electronic ground taxi scenario. For example, the controller 212 may hold the fan speed constant (e.g., the rotational speed of the rotor assembly 20) and allow the electrical power provided by the second starter motor 102 to ramp out as the aerodynamic drive mechanical torque (e.g., the LP aerodynamic torque 1110) is provided during the progression of the start-up operation. For example, as the LF shaft 5055 gains aerodynamic torque as the HP shaft 4045 spools up, the controller 212 may reduce the electrical power demand on the second starter motor 102 while the aerodynamic assistance ramps up. For example, by the time the HP system reaches "idle," the second starter motor 102 may be turned off and/or may be at a lower adaptive power setting.

In an illustrative non-limiting example, in FIG. 11 at 1104, the speed of the LP shaft 5055 follows the power demanded by the second starter motor 102 at 1102. At 1114, the speed 1112 of the HP shaft 4045 may start increasing when torque is provided to the HP shaft 4045 by the first starter motor 101. At 1116, the aerodynamic coupling driven by the speed of the HP shaft 4045 is shown by the LP aerodynamic torque 1110. In some embodiments, at 1118 and/or proximate 1114 and/or 1116, the controller 212 may cause the second starter motor 102 to decrease and/or stop applying torque to the LF shaft 5055. In some embodiments, the application of the LP starter torque 1108 schedule may be based on a total LP torque 1106 schedule determined by the controller 212. In some embodiments, while HP shaft 4045 starts to spool-up (due to a commanded start at 1114), the controller 212 may keep the speed 1104 of the LP shaft 5055 on the speed 1102 demanded by the LP shaft 5055 by trading out LP starter torque 1108 for the LP aerodynamic torque 1110.

Figure 12:
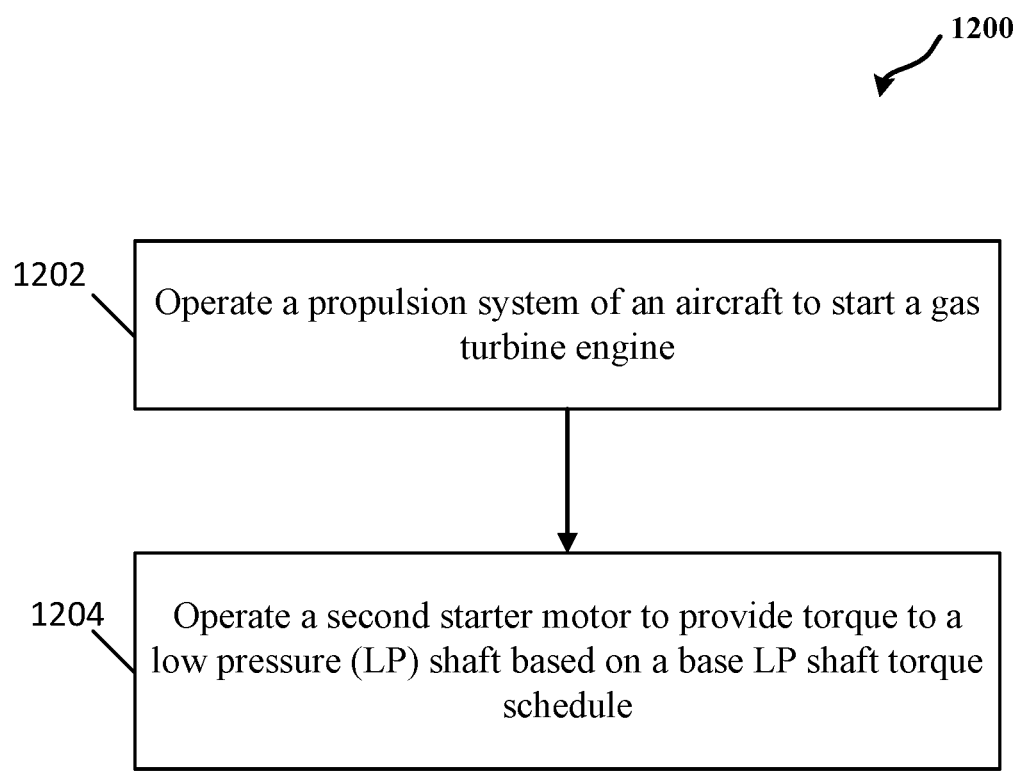
FIG. 12 is a flow diagram of a method used in operating a propulsion system according to some embodiments.

FIG. 12 is a flow diagram of a method 1200 used in operating a propulsion system according to some embodiments. In some embodiments, the method 1200 is used in the engine 100 of FIG. 1. The method 1200 can include, at step 1202, operating a propulsion system of an aircraft to start a gas turbine engine. In some embodiments, the gas turbine engine includes a low speed spool and a high speed spool. The low speed spool may include a low pressure (LP) compressor coupled to a LP turbine via a LP shaft. The high speed spool may include a high pressure (HP) compressor coupled to a HP turbine via a HP shaft. In some embodiments, a first starter motor is coupled to the HP shaft. In some embodiments, a second starter motor is coupled to the LP shaft. Alternatively or in addition, the method 1200 may include, at step 1204, operating, by a controller of the propulsion system, the second starter motor to provide torque to the LP shaft based on a base LP shaft torque schedule. In some embodiments, the base LP shaft torque schedule may include one or more base LP shaft torque schedules described herein.

FIG. 13 is a diagram of exemplary base LP shaft torque schedules according to some embodiments. In some embodiments, at step 1204, the base LP shaft torque schedule used in operating the second starter motor may be one of the base LP shaft torque schedules shown in FIGS. 3, 4, 5A-5B, 6A-6B, 7A-7B, 8A-8B, 9A-9B, 10B, and 11. For example, the controller 212 may determine which one of the base LP shaft torque schedules based on one or more EGT/T5/Exhaust gas temperatures, a ratio of an EGT to an EGT target set point, a pinched region in EGT/T5, an engine's EGT/T5/Exhaust gas temperatures, a pinched region in compressor operability, and an EGT/T5 thermal pinch point.

There are multiple benefits in having a starter motor provide torque to an LP shaft in accordance with a base LP shaft torque schedule. For example, a reduction (less airflow required) and/or elimination of other sub-systems that may be needed for starting an engine (e.g., less bleed requirements to start an engine). Another benefit is that it covers more variation effects. For example, for a free spinning LP shaft (that is, the rotation of a LP shaft is due to the aerodynamic coupling with a HP shaft 4045), there may have several effects that could impact aircraft and/or engine start time including oil temperature, viscous drag terms, outside ambient conditions, and/or engine deterioration (turbine, fan, etc.). Another benefits is allowing a starter motor coupled to an HP shaft to be sized smaller relative to a standard or average size engine not implementing or using base LP shaft torque schedules described herein; which saves weight (e.g., engine weight, gearbox weight, to name a few) and/or reduces the envelope that lead to at least reductions in specific fuel consumption (SFC) and/or easier under cowl integration, to name a few. Another benefit is a quicker start time of an engine to improve ground operations for airliners. Another benefit is an increased aircraft utilization for airliners.

Further aspects of the disclosure are provided by the subject matter of the following clauses:

A propulsion system including: a gas turbine engine comprising a low speed spool and a high speed spool, the low speed spool comprising a low pressure (LP) compressor coupled to a LP turbine via a LP shaft, and the high speed spool comprising a high pressure (HP) compressor coupled to a HP turbine via a HP shaft; a first starter motor coupled to the HP shaft and configured to provide motive power to spin the HP shaft to start the gas turbine engine; a second starter motor coupled to the LP shaft and configured to provide torque to the LP shaft; and a controller configured to: operate on the second starter motor to provide the torque to the LP shaft based on a base LP shaft torque schedule.

The propulsion system of any preceding clause, wherein the base LP shaft torque schedule comprises a schedule on when to increase, maintain, and decrease the torque applied to the LP shaft in order to increase compressor operability margin.

The propulsion system of any preceding clause, wherein the base LP shaft torque schedule is associated with the gas turbine engine.

The propulsion system of any preceding clause, wherein, in response to the controller receiving data corresponding to an indication that a ratio of an exhaust gas temperature (EGT) to an EGT target set point is greater than a threshold, the controller is further configured to operate the second starter motor to provide additional torque to the LP shaft based on a high EGT ratio LP shaft torque schedule, and wherein the high EGT ratio shaft torque schedule comprises a schedule on when to increase, maintain, and decrease the additional torque applied to the LP shaft in order to increase EGT temperature margin.

The propulsion system of any preceding clause, wherein the base LP shaft torque schedule comprises a schedule on when to increase, maintain, and decrease the torque applied to the LP shaft in order to match a speed of the LP shaft with a target speed of the LP shaft within a threshold.

The propulsion system of any preceding clause, wherein the controller is further configured to adaptively modify the base LP shaft torque schedule in response to an indication that a ratio of an exhaust gas temperature (EGT) to an EGT target is greater than a threshold.

The propulsion system of any preceding clause, wherein the controller is further configured to: detect that a required total power to provide respective torque to each of the HP shaft and the LP shaft is greater than a total supplied power by the first starter motor and the second starter motor; and prioritize the first starter motor in power allocation until a speed or power of the HP shaft matches a target speed or power of the HP shaft within a threshold.

The propulsion system of any preceding clause, wherein the controller is further configured to: in response to starting the gas turbine engine, detect that other gas turbine engine is yet to be started; and allocate at least a portion of the total supplied power of at least one of the first starter motor or the second starter motor or both to start the other gas turbine engine.

The propulsion system of any preceding clause, wherein the controller is further configured to: determine an additional torque to apply to at least one of the HP shaft or the LP shaft or both using one or more embedded models based on one or more of engine start time, operability margins, engine thermals, and vibration.

The propulsion system of any preceding clause, wherein the base LP shaft torque schedule comprises a first schedule on when to increase, maintain, and decrease the torque applied to the LP shaft in order to generate sufficient thrust to move an aircraft during an electric taxi on a runway, and a second schedule on when the torque applied to the HP shaft is provided by the first starter motor relative the first schedule.

A method including operating a propulsion system of an aircraft to start a gas turbine engine, the gas turbine engine comprising a low speed spool and a high speed spool, wherein the low speed spool comprises a low pressure (LP) compressor coupled to a LP turbine via a LP shaft, and the high speed spool comprises a high pressure (HP) compressor coupled to a HP turbine via a HP shaft, and wherein a first starter motor is coupled to the HP shaft and a second starter motor is coupled to the LP shaft; and operating, by a controller of the propulsion system, the second starter motor to provide torque to the LP shaft based on a base LP shaft torque schedule.

The method of any preceding clause, wherein the base LP shaft torque schedule comprises a schedule on when to increase, maintain, and decrease the torque applied to the LP shaft in order to increase compressor operability margin.

The method of any preceding clause, wherein the base LP shaft torque schedule is associated with the gas turbine engine.

The method of any preceding clause, further including receiving, by the controller, data corresponding to an indication that a ratio of an exhaust gas temperature (EGT) to an EGT target is greater than a threshold; and operating, by the controller, the second starter motor to provide additional torque to the LP shaft based on a high EGT ratio LP shaft torque schedule in response to receiving the data, wherein the high EGT ratio LP shaft torque schedule comprises a schedule on when to increase, maintain, and decrease the additional torque applied to the LP shaft in order to increase EGT temperature margin.

The method of any preceding clause, wherein the base LP shaft torque schedule comprises a schedule on when to increase, maintain, and decrease the torque applied to the LP shaft in order to match a speed of the LP shaft with a target speed of the LP shaft within a threshold.

The method of any preceding clause, further including adaptively modifying the base LP shaft torque schedule in response to an indication that a ratio of an exhaust gas temperature (EGT) to an EGT target is greater than a threshold.

The method of any preceding clause, further including detecting, by the controller, that a required total power to provide respective torque to each of the HP shaft and the LP shaft is greater than a total supplied power by the first starter motor and the second starter motor; and prioritizing, by the controller, the first starter motor in power allocation until a speed of the HP shaft matches a target speed of the HP shaft within a threshold.

The method of any preceding clause, further including in response to starting the gas turbine engine, detecting, by the controller, that other gas turbine engine is yet to be started; and allocating, by the controller, at least a portion of the total supplied power of at least one of the first starter motor or the second starter motor or both to start the other gas turbine engine.

The method of any preceding clause, further including determining, by the controller, an additional torque to apply to at least one of the HP shaft or the LP shaft or both using one or more embedded models based on one or more of engine start time, operability margins, engine thermals, and vibration.

A non-transitory, machine-accessible storage medium having computer instructions and wherein the computer instructions are configured, when executed by a controller, to cause the controller to: operate a propulsion system of an aircraft to start a gas turbine engine, the gas turbine engine comprising a low speed spool and a high speed spool, wherein the low speed spool comprises a low pressure (LP) compressor coupled to a low pressure turbine via a low pressure shaft, and the high speed spool comprises a high pressure (HP) compressor coupled to a HP turbine via a HP shaft, and wherein a first starter motor is coupled to the HP shaft and a second starter motor is coupled to the LP shaft; and operate the second starter motor to provide torque to the LP shaft based on a base LP shaft torque schedule.

A controller of a propulsion system, the controller comprising: at least one processor configured to: operate on a first starter motor to provide motive power to spin a high pressure (HP) shaft to start a gas turbine engine; and operate on a second starter motor to provide a torque to a low pressure (LP) shaft based on a base LP shaft torque schedule, wherein the gas turbine engine comprises a low speed spool and a high speed spool, the low speed spool comprising a LP compressor coupled to a LP turbine via the LP shaft, and the high speed spool comprising a HP compressor coupled to a HP turbine via the HP shaft.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A propulsion system comprising:
    a gas turbine engine comprising a low speed spool and a high speed spool, the low speed spool comprising a low pressure (LP) compressor coupled to a LP turbine via a LP shaft, and the high speed spool comprising a high pressure (HP) compressor coupled to a HP turbine via a HP shaft;
    a first starter motor coupled to the HP shaft and configured to provide motive power to spin the HP shaft to start the gas turbine engine;
    a second starter motor coupled to the LP shaft and configured to provide torque to the LP shaft; and
    a controller configured to:
        operate on the second starter motor to provide the torque to the LP shaft based on a base LP shaft torque schedule;
        detect that a required total power to provide respective torque to each of the HP shaft and the LP shaft is greater than a total supplied power by the first starter motor and the second starter motor; and
        prioritize the first starter motor in power allocation until a speed or power of the HP shaft matches a target speed or power of the HP shaft within a threshold.

2. The propulsion system of claim 1, wherein the base LP shaft torque schedule comprises a schedule on when to increase, maintain, and decrease the torque applied to the LP shaft in order to increase compressor operability margin.

3. The propulsion system of claim 1, wherein the base LP shaft torque schedule is associated with the gas turbine engine.

4. The propulsion system of claim 1, wherein, in response to the controller receiving data corresponding to an indication that a ratio of an exhaust gas temperature (EGT) to an EGT target set point is greater than an EGT threshold, the controller is further configured to operate the second starter motor to provide additional torque to the LP shaft based on a high EGT ratio LP shaft torque schedule, and wherein the high EGT ratio LP shaft torque schedule comprises a schedule on when to increase, maintain, and decrease the additional torque applied to the LP shaft in order to increase EGT temperature margin.

5. The propulsion system of claim 1, wherein the base LP shaft torque schedule comprises a schedule on when to increase, maintain, and decrease the torque applied to the LP shaft in order to match a speed of the LP shaft with a target speed of the LP shaft within an LP threshold.

6. The propulsion system of claim 1, wherein the controller is further configured to adaptively modify the base LP shaft torque schedule in response to an indication that a ratio of an exhaust gas temperature (EGT) to an EGT target is greater than an EGT threshold.

7. The propulsion system of claim 1, wherein the controller is further configured to:
    in response to starting the gas turbine engine, detect that an other gas turbine engine is yet to be started; and
    allocate at least a portion of the total supplied power of at least one of the first starter motor or the second starter motor or both to start the other gas turbine engine.

8. The propulsion system of claim 1, wherein the controller is further configured to: determine an additional torque to apply to at least one of the HP shaft or the LP shaft or both using one or more embedded models based on one or more of engine start time, operability margins, engine thermals, and vibration.

9. The propulsion system of claim 1, wherein the base LP shaft torque schedule comprises a first schedule on when to increase, maintain, and decrease the torque applied to the LP shaft in order to generate sufficient thrust to move an aircraft during an electric taxi on a runway, and a second schedule on when the torque applied to the HP shaft is provided by the first starter motor relative the first schedule.

10. A method, the method comprising:
    operating a propulsion system of an aircraft to start a gas turbine engine, the gas turbine engine comprising a low speed spool and a high speed spool, wherein the low speed spool comprises a low pressure (LP) compressor coupled to a LP turbine via a LP shaft, and the high speed spool comprises a high pressure (HP) compressor coupled to a HP turbine via a HP shaft, and wherein a first starter motor is coupled to the HP shaft and a second starter motor is coupled to the LP shaft;
    operating, by a controller of the propulsion system, the second starter motor to provide torque to the LP shaft based on a base LP shaft torque schedule;
    detecting, by the controller, that a required total power to provide respective torque to each of the HP shaft and the LP shaft is greater than a total supplied power by the first starter motor and the second starter motor; and
    prioritizing, by the controller, the first starter motor in power allocation until a speed of the HP shaft matches a target speed of the HP shaft within a threshold.

11. The method of claim 10, wherein the base LP shaft torque schedule comprises a schedule on when to increase, maintain, and decrease the torque applied to the LP shaft in order to increase compressor operability margin.

12. The method of claim 10, wherein the base LP shaft torque schedule is associated with the gas turbine engine.

13. The method of claim 10, further comprising:
    receiving, by the controller, data corresponding to an indication that a ratio of an exhaust gas temperature (EGT) to an EGT target is greater than an EGT threshold; and
    operating, by the controller, the second starter motor to provide additional torque to the LP shaft based on a high EGT ratio LP shaft torque schedule in response to receiving the data, wherein the high EGT ratio LP shaft torque schedule comprises a schedule on when to increase, maintain, and decrease the additional torque applied to the LP shaft in order to increase EGT temperature margin.

14. The method of claim 10, wherein the base LP shaft torque schedule comprises a schedule on when to increase, maintain, and decrease the torque applied to the LP shaft in order to match a speed of the LP shaft with a target speed of the LP shaft within an LP threshold.

15. The method of claim 10, further comprising adaptively modifying the base LP shaft torque schedule in response to an indication that a ratio of an exhaust gas temperature (EGT) to an EGT target is greater than an EGT threshold.

16. The method of claim 10, further comprising:
   in response to starting the gas turbine engine, detecting, by the controller, that an other gas turbine engine is yet to be started; and
   allocating, by the controller, at least a portion of the total supplied power of at least one of the first starter motor or the second starter motor or both to start the other gas turbine engine.

17. The method of claim 10, further comprising determining, by the controller, an additional torque to apply to at least one of the HP shaft or the LP shaft or both using one or more embedded models based on one or more of engine start time, operability margins, engine thermals, and vibration.

18. A non-transitory, machine-accessible storage medium having computer instructions and wherein the computer instructions are configured, when executed by a controller, to cause the controller to:
   operate a propulsion system of an aircraft to start a gas turbine engine, the gas turbine engine comprising a low speed spool and a high speed spool, wherein the low speed spool comprises a low pressure (LP) compressor coupled to a LP turbine via a LP shaft, and the high speed spool comprises a high pressure (HP) compressor coupled to a HP turbine via a HP shaft, and wherein a first starter motor is coupled to the HP shaft and a second starter motor is coupled to the LP shaft;
   operate the second starter motor to provide torque to the LP shaft based on a base LP shaft torque schedule shaft;
   detect that a required total power to provide respective torque to each of the HP shaft and the LP shaft is greater than a total supplied power by the first starter motor and the second starter motor; and
   prioritize the first starter motor in power allocation until a speed or power of the HP shaft matches a target speed or power of the HP shaft within a threshold.

* * * * *